US007128888B2

(12) United States Patent
Li et al.

(10) Patent No.: US 7,128,888 B2
(45) Date of Patent: Oct. 31, 2006

(54) PROTON CONDUCTOR AND METHOD FOR MANUFACTURING THE SAME, AND ELECTROCHEMICAL DEVICE

(75) Inventors: Yong Ming Li, Kanagawa (JP); Koichiro Hinokuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 551 days.

(21) Appl. No.: 10/195,235

(22) Filed: Jul. 15, 2002

(65) Prior Publication Data

US 2003/0072985 A1 Apr. 17, 2003

(30) Foreign Application Priority Data

Oct. 11, 2001 (JP) .......................... P2001-313995
May 14, 2002 (JP) .......................... P2002-138210

(51) Int. Cl.
*B01J 19/08* (2006.01)
*C01B 31/02* (2006.01)

(52) U.S. Cl. .............................. 423/445 B; 423/447.2; 423/447.3; 429/30; 429/33; 429/304; 252/500

(58) Field of Classification Search ................ 429/304, 429/33, 30; 423/447.2, 445 B, 447.3; 252/500, 252/502
See application file for complete search history.

(56) References Cited

U.S. PATENT DOCUMENTS

| | | | | |
|---|---|---|---|---|
| 5,470,680 A | 11/1995 | Loutfy et al. | 429/218 |
| 5,739,376 A * | 4/1998 | Bingel | 560/51 |
| 6,162,926 A | 12/2000 | Murphy et al. | 548/417 |
| 6,231,980 B1 | 5/2001 | Cohen et al. | 428/402 |
| 6,495,290 B1 * | 12/2002 | Hinokuma et al. | 429/231.8 |
| 6,635,377 B1 * | 10/2003 | Hinokuma | 429/33 |

FOREIGN PATENT DOCUMENTS

| | | | |
|---|---|---|---|
| EP | 1 071 149 A2 | 1/2001 |
| JP | 03-167712 | 7/1991 |
| JP | 2000-11756 A | 1/2000 |
| JP | 2002-256007 | 9/2000 |
| WO | WO94/03503 A1 | 2/1994 |
| WO | WO00/66254 A1 | 11/2000 |
| WO | WO 01/06519 A1 | 1/2001 |

OTHER PUBLICATIONS

Cheng et al., "Organophosphorus chemistry of fullerene: synthesis and biological effects of organophosphorus compounds of C60," Tetrahedron, vol. 57, pp. 7331-7335, Jun. 20, 2001.
Cheng et al., "Synthesis and optical properties of tetraethyl methano[60]fullerenediphosphonate," Tetrahedron Letters, vol. 41, pp. 3947-3950, Mar. 21, 2000.

* cited by examiner

*Primary Examiner*—Bruce F. Bell
(74) *Attorney, Agent, or Firm*—Bell, Boyd & Lloyd LLC

(57) ABSTRACT

A proton conductor, a method for manufacturing the same, and an electrochemical device using the proton conductor are provided. The proton conductor includes a carbon derivative which has a carbon material selected from the group consisting of a fullerene molecule, a cluster consisting essentially of carbon, a fiber-shaped carbon and a tube-shaped carbon, and mixtures thereof; and at least a proton dissociative group, the proton dissociative group being bonded to the carbon material via a cyclic structure of tricyclic or more. The method includes the steps of obtaining the carbon derivative, hydrolyzing the derivative with alkali hydroxide, subjecting the hydrolyzed product to ion exchange, and forming a group with proton-dissociating properties.

6 Claims, 16 Drawing Sheets

$C_{70}$ $C_{60}$

EXAMPLES OF CARBON CLUSTERS $C_{18}H_{24}$ $C_{20}H_{20}$ $C_{22}H_{28}$ $C_{60}$ $C_{60}$ $C_{76}$ $C_{70}$ $C_{78}$

F I G. 8
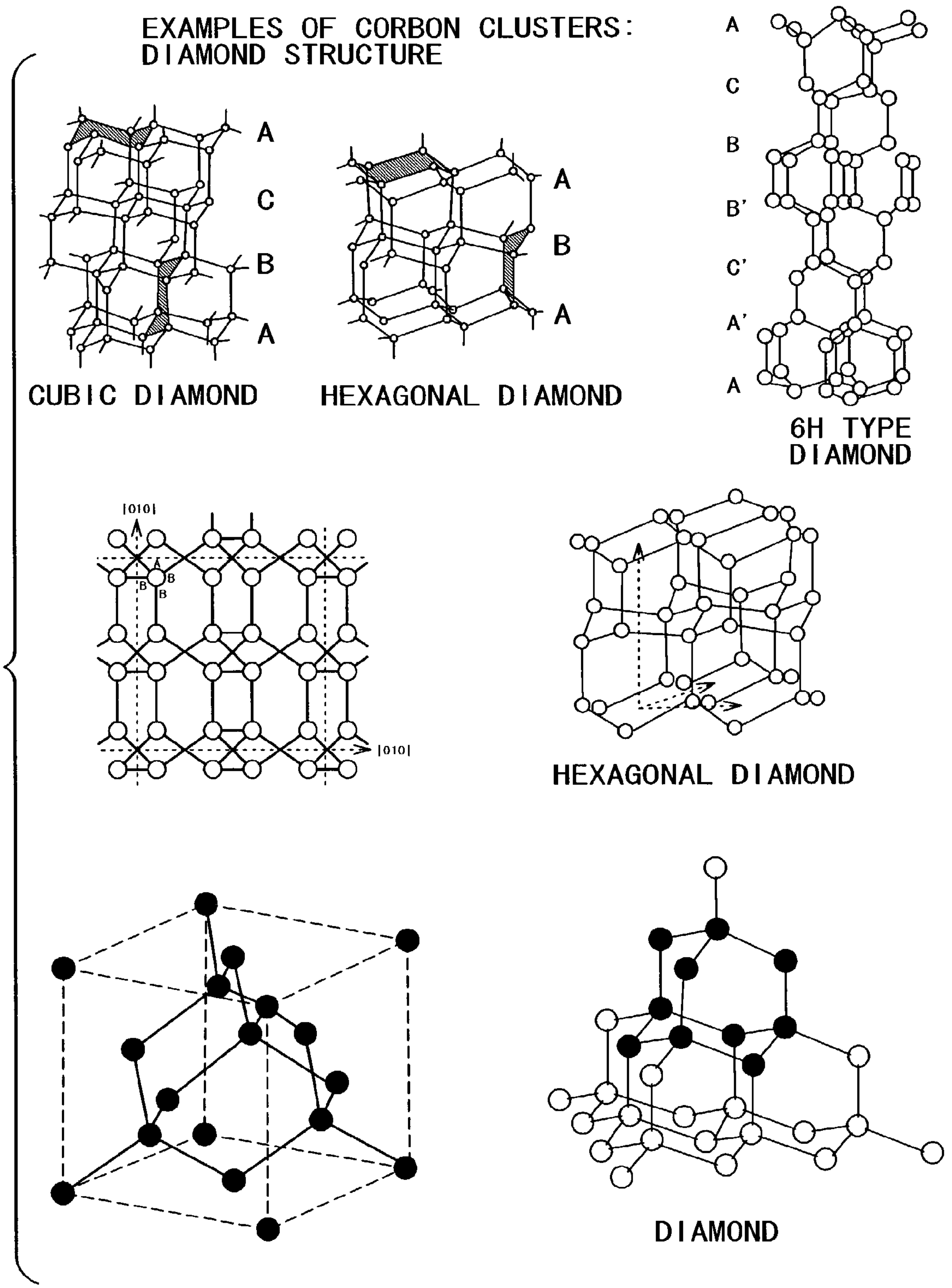

F I G. 1 1
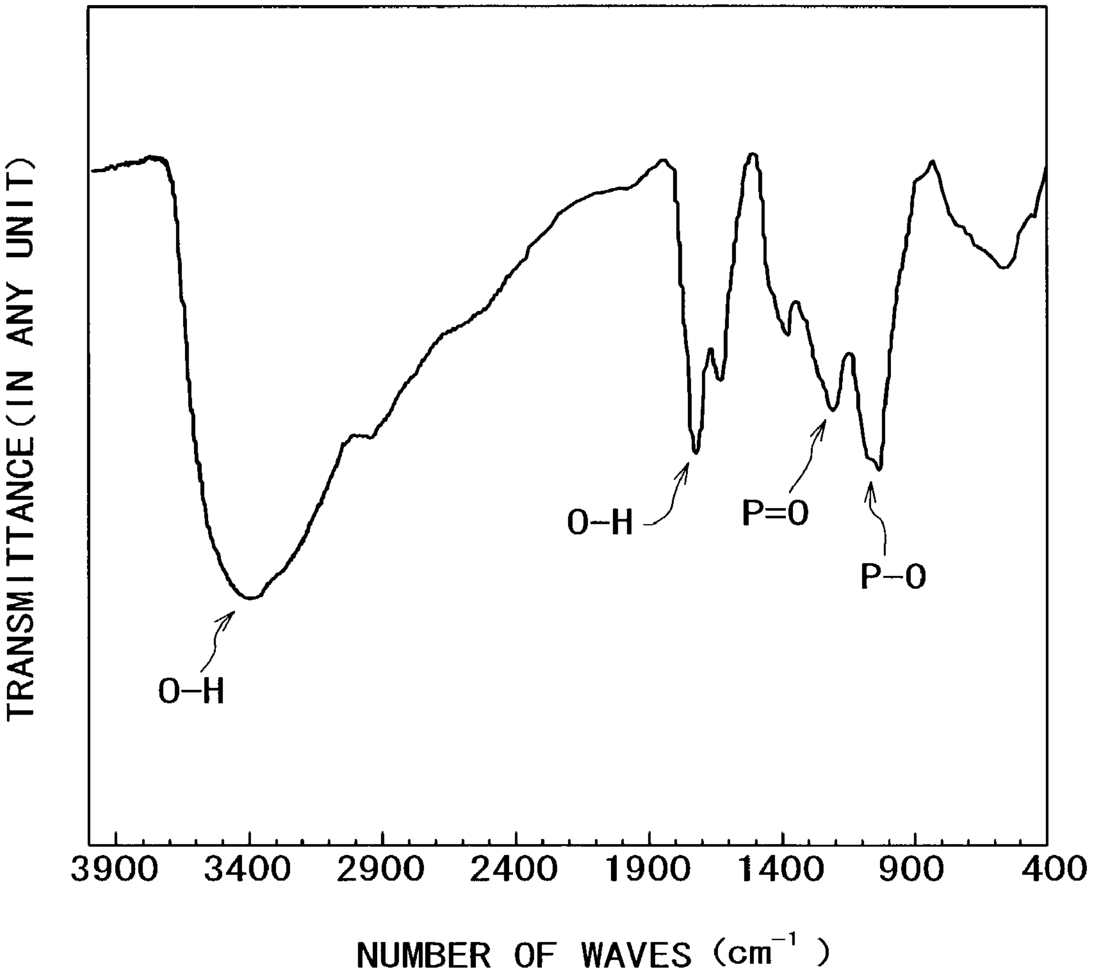

PROTON CONDUCTOR AND METHOD FOR MANUFACTURING THE SAME, AND ELECTROCHEMICAL DEVICE

RELATED APPLICATION DATA

The present application claims priority to Japanese Patent Application No. P2001-313995 filed on Oct. 11, 2001 and Japanese Patent Application No. P2002-138210 filed on May 14, 2002. The above-referenced Japanese patent applications are incorporated herein by reference to the extent permitted by law.

BACKGROUND OF THE INVENTION

The present invention relates to a proton conductor and a method for manufacturing the proton conductor, and also relates to an electrochemical device.

On-going efforts continue in an attempt to develop the fuel cell because attention is focused on the fuel cell as an environment-oriented electric energy generating system for the next generation from the reasons such as its high efficiency and cleanliness with respect to power generation.

Fuel cell can be roughly divided according to the types of proton conductor used in it because the operating temperature and the condition in use exert strong influence on the property of the proton conductor. Because the property of the proton conductor in use gives strong influence on performance characteristics of the fuel cell, it is essential to improve performance of the proton conductor in order to have the fuel cell with better performance characteristics.

In general, in the temperature range from normal temperature to lower than 100° C., proton-conductive macromolecular film is used, which has solid macromolecular film. Typical examples include NAFION (trade name; DU PONT De NEMOURS & CO.) or GORE FILM (GORE & ASSOCIATES). These are perfluorosulfonic acid resins, and efforts continue in an attempt to make modifications and improvements of these types of products. In addition to these perfluoro type resins, hydrocarbon type macromolecular film have been known in recent years.

Also, as relatively new types of inorganic metal oxide type proton conductor, polymolybdic acids or oxides having a large amount of conductor, polymolybdic acids or oxides having a large amount of water of hydration such as $H_3M_{12}PO_{40}.29H_2O$ (M=Mo,W) or $Sb_2O_5.nH_2O$ are known.

When these macromolecular materials or hydrated compounds are placed under humid conditions, they exhibit high proton conductive property near normal temperature. Specifically, if an example is taken on perfluoro-sulfonic acid resin, protons electrolytically dissociated from sulfonic group are bonded with moisture which is extensively contained in macromolecular matrix (hydrogen bonding), and protonized water, i.e. oxonium ions ($H_3O^+$) are generated. Because protons in form of oxonium ions can smoothly migrate in macromolecular matrix, matrix material of this type can provide considerably high proton conductive effect even at normal temperature.

On the other hand, a proton conductor with conductive mechanism entirely different from these has been recently developed. Specifically, it has been found that complex metal oxides with perovskite structure such as $SrCeO_3$ doped with Yb have proton conductivity even when moisture is not used as migration medium. It appears that, in the complex metal oxides, protons are conducted through channel between oxygen ions, which form skeletons of the perovskite structure.

In this case, it is not that conductive protons are present in the complex metal oxides from the beginning. It is believed that, when the perovskite structure is brought into contact with vapor contained in atmospheric gas in the surroundings, water molecules at high temperature react with oxygen-lacking portion in the perovskite structure by doping, and protons are generated only when this reaction takes place.

However, in the proton conductor as described above, there are a number of problems.

For example, the matrix material such as perfluorosulfonic acid resin must be continuously maintained under sufficiently humid condition during use in order to keep proton conductive property at high level. Also, for the purpose of preventing freezing or boiling of water contained in the matrix, the range of the operating temperature should not be wide.

In case of inorganic metal oxide proton conductor such as $H_3M_{12}PO_{40}.29H_2O$ (M=Mo,W) or $Sb_2O_5.nH_2O$, temperature must be maintained high in order to keep structural water contained therein so that significant proton conduction is carried out. Also, in a certain type of perovskite oxide such as $SrCeO_3$, operating temperature must be kept at high level, i.e. 500° C. or higher. When humidity is low, proton conductivity rapidly decreases.

As described above, the conventional type proton conductor depends much on the atmospheric conditions, e.g. moisture must be supplied or vapor is needed. Moreover, there are problems that operating temperature is too high or temperature range is too narrow.

Therefore, humidifier or other types of accessory equipment or device are needed for a system such as fuel cell. This unavoidably requires the designing of the system in larger size or higher cost for system construction. A need, therefore, exists to provide an improved proton conductor and methods of making and using same.

SUMMARY OF THE INVENTION

The present invention provides an improved proton conductor, a method for manufacturing the same, and an electrochemical device, which can be used even under dry atmosphere or in relatively wide temperature range including room temperature, and by which it is possible to extensively improve proton conductivity.

In an embodiment, a proton conductor includes a carbon derivative which has a carbon material that includes, for example, a fullerene molecule, a cluster consisting essentially of carbon, a fiber-shaped carbon, a tube-shaped carbon, the like and mixtures thereof, and at least a proton dissociative group, the proton dissociative group being bonded to the carbon material via a cyclic structure, such as tricyclic or more.

As used herein, the term, "a group with proton ($H^+$)-dissociating property" or other like term means a group, from which protons can be ionized or electrolytically dissociated. Also, the term "proton-dissociating" or the like means that protons are separated by ionizing or electrolytic dissociation.

In another embodiment, the present invention provides a proton conductor including a carbon derivative which has a carbon material that includes, for example, a fullerene molecule, a cluster consisting essentially of carbon, a fiber-shaped carbon, a tube-shaped carbon, the like and mixtures thereof; and a functional group, having proton-dissociating property. In this regard, the proton conductor of the present invention is less dependent on atmosphere and exhibits high proton conductive property even in dry air or in wide temperature range including high temperature, and it can be continuously used. Even when moisture is present, this is not problematic to the performance of the proton conductor according to an embodiment of the present invention.

The functional group as described above is bonded to the carbon material via a cyclic structure such as tricyclic or more. In this regard, it is possible to attain high heat-resistant property and high chemical stability.

In still another embodiment, the present invention provides a method for manufacturing a proton conductor, the method including the steps of obtaining a carbon derivative which has a carbon material selected from the group consisting of a fullerene molecule, a cluster consisting essentially of carbon, a fiber-shaped carbon and a tube-shaped carbon, and mixtures thereof, and a functional group, having an ester group as a precursor of a group with proton-dissociating property, the functional group being bonded to the carbon material via a cyclic structure of tricyclic or more; hydrolyzing the derivative with alkali hydroxide; and forming a group with proton-dissociating property through ion exchange of the hydrolyzed product.

According to the method for manufacturing the proton conductor, it is possible to manufacture the proton conductor of the present invention having excellent properties as described above in easy and efficient manner and to reduce the cost for the manufacture. Also, it is possible to manufacture the product on mass-production basis.

In yet another embodiment, the present invention provides an electrochemical device, having a first electrode, a second electrode, and a proton conductor sandwiched or disposed between these two electrodes, wherein the proton conductor includes a carbon derivative which has a carbon material that includes, for example, a fullerene molecule, a cluster consisting essentially of carbon, a fiber-shaped carbon, a tube-shaped carbon, the like and mixtures thereof; and at least a proton dissociative group, the proton dissociative group being bonded to the carbon material via a cyclic structure, such as tricyclic or more.

According to the electrochemical device of the present invention, the proton conductor sandwiched between the first electrode and the second electrode includes the derivative serving as the proton conductor of the present invention with excellent properties as described above. As a result, it can provide the same effects as those of the proton conductor of the present invention. No humidifier is required, and it is possible to design the system in small size and in simple structure.

In a further embodiment, the present invention provides a proton conductor including a carbon derivative which has a carbon material that includes, for example, a fullerene molecule, a cluster consisting essentially of carbon, a fiber-shaped carbon, a tube-shaped carbon, the like and mixtures thereof, and at least one group of formula (1) or (2), the group being bonded to the carbon material, formula (1):

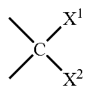

-continued formula (2):

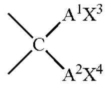

wherein $X^1$, $X^2$, $X^3$ and $X^4$ independently represent of each other a proton dissociative group, and $A^1$ and $A^2$ independently represent of each other —O—, —R—, —O—R—, —R—O—, —O—R—O—, or —R—O—R— where R is an alkyl group represented by $C_xH_y$, wherein x represents an integer of 1 to 20, and y represents an integer of 0 to 40.

In an embodiment, the present invention provides a proton conductor including a carbon derivative which has a carbon material that includes a fullerene molecule, a cluster consisting essentially of carbon, a fiber-shaped carbon, a tube-shaped carbon, the like and mixtures thereof, and at least a group of formula (3), the group being bonded to the carbon material, formula (3):

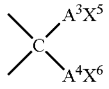

wherein $X^5$ and $X^6$ independently represent of each other a proton dissociative group, and $A^3$ and $A^4$ independently represent of each other —O—, —R'—, —O—R'—, —R'—O—, —O—R'—O—, —R'—O—R"— (R' and R" are alkyl groups represented by $C_{x'}C_{y'}H_{z'}$, wherein x' represents an integer of 1 to 20, y' represents an integer of 1 to 40, and z' represents an integer of 0 to 39.

In this case also, from the reasons as described above, chemical stability of the material is extensively improved and the material has high heat-resistant property.

In another embodiment, the present invention provides a proton conductor containing a carbon material expressed by the following molecular formula (1) or (2):

$C_{60}=(C(PO(OH)_2)_2)_n$ Molecular formula (1)

$C_{60}=(C(SO_3H)_2)_n$ Molecular formula (2)

(where n in the molecular formula (1) and (2) represents a number of 1 to 30).

Additional features and advantages of the present invention are described in, and will be apparent from, the following Detailed Description of the Invention and the Figures.

BRIEF DESCRIPTION OF THE FIGURES

FIG. 8 represents schematic drawings showing examples of carbon clusters including diamond structures according to an embodiment of the present invention.

FIG. 11 is a graph showing the results of measurement of FT-IR according to an embodiment of the present invention.

DETAILED DESCRIPTION OF THE INVENTION

The present invention relates to a proton conductor, an electrochemical device employing same, and methods of manufacturing and using same.

Figure 1A:
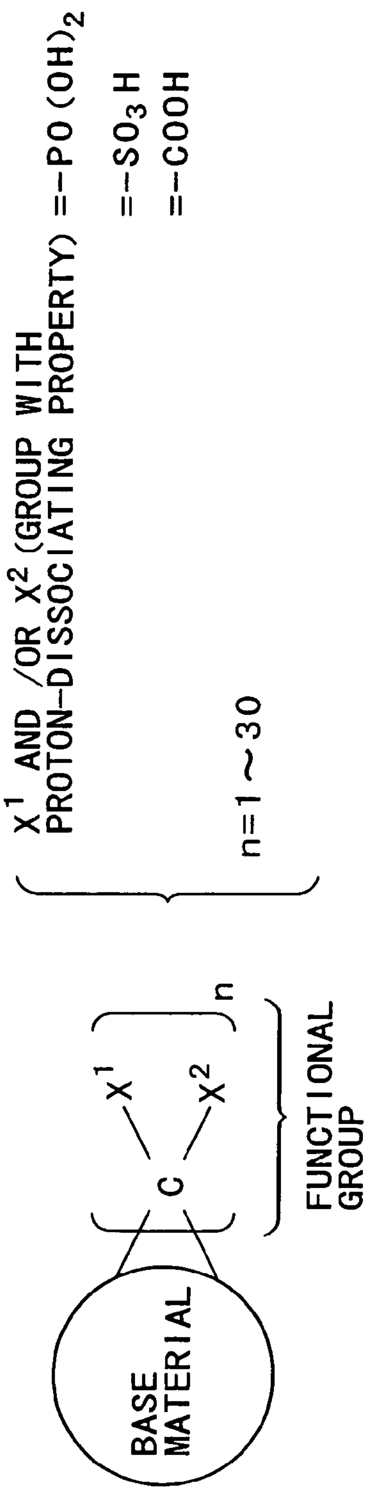
FIG. 1A represents a general scheme of a proton conductor according to an embodiment of the present invention.
Figure 1B:
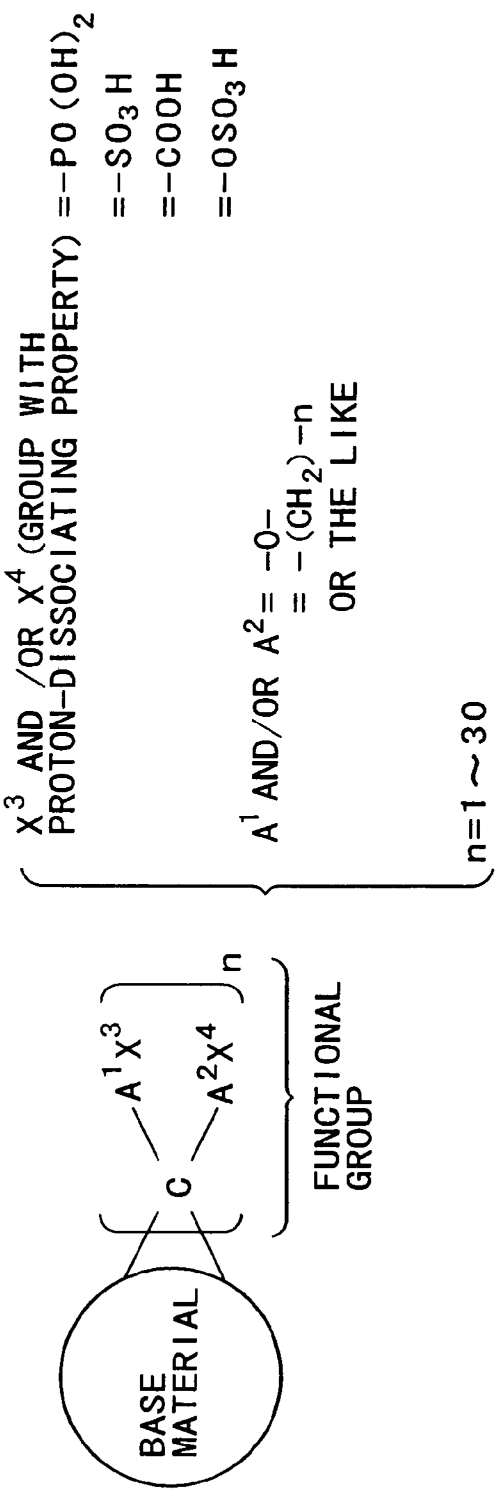
FIG. 1B represents a general scheme of a proton conductor according to an embodiment of the present invention.

As shown in the general schemes of the proton conductor of the present invention in FIG. 1A and FIG. 1B, the functional group having a group with proton-dissociating property expressed by the general formula (1) or (2) is bonded via the tricyclic structure to the base material, into which the functional group is to be introduced. As a result, the cyclic structure is stable, and there are two or more bonding sites. Even when the bonding may be broken up, radicals can be bonded again. Chemical stability of the material is extensively improved and the material has high heat-resistant property. The functional group may be bonded via the tricyclic structure or via a cyclic structure of tricyclic or more. In such case, it is possible to further improve chemical stability and heat-resistant property.

In the general formula (1) and (2), it is preferable that at least one of the groups with proton-dissociating property is, for example, —$PO(OH)_2$, —$SO_3H$, —COOH or the like. In the general formula (2), at least one of the groups with proton-dissociating property includes —$OSO_3H$ or the like.

The number of the functional groups to be bonded to one base material can be controlled in the range from 1 to 30 by adjusting molar ratio of the raw material serving as the base material during synthesis and the other raw materials added to it. For instance, it is possible to add the functional groups to all of the double bonds on the base material. The more the number of the functional groups on the base material is, the more the number of protons is increased, and the more the conductivity is increased.

In an embodiment, the present invention provides a proton conductor including a carbon derivative which has a carbon material that includes a fullerene molecule, a cluster consisting essentially of carbon, a fiber-shaped carbon, a tube-shaped carbon, the like and mixtures thereof; and at least a group of formula (3), the group being bonded to the carbon material, formula (3):

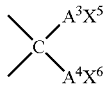

wherein $X^5$ and $X^6$ independently represent of each other a proton dissociative group, and $A^3$ and $A^4$ independently represent of each other —O—, —R'—, —O—R'—, —R'—O—, —O—R'—O—, —R'—O—R"—R' and R" are alkyl groups represented by $C_{x'}F_{y'}H_{z'}$, wherein x' represents an integer of 1 to 20, y' represents an integer of 1 to 40, and z' represents an integer of 0 to 39.

In this case also, from the reasons as described above, chemical stability of the material is extensively improved and the material has high heat-resistant property.

In the general formula (3) as described above, it is preferable that at least one of the groups with proton-dissociating property is —$PO(OH)_2$, —$SO_3H$, —COOH or the like.

When the radical —$PO(OH)_2$ is used as the group with proton-dissociating property as described above, the number of protons to be dissociated for each functional group bonded to the base material is four. Therefore, it is possible to attain high proton conductivity and also to extensively improve chemical stability. When the radical —$SO_3H$ is used, proton-dissociating property is higher, and it is possible to attain higher proton conductivity.

In another embodiment, the present invention provides a proton conductor containing a carbon material expressed by the following molecular formula (1) or (2):

$$C_{60}{=}(C(PO(OH)_2)_2)_n \qquad \text{Molecular formula (1)}$$

$$C_{60}{=}(C(SO_3H)_2)_n \qquad \text{Molecular formula (2)}$$

(where n in the molecular formula (1) and (2) represents a number of 1 to 30).

Figure 2A:
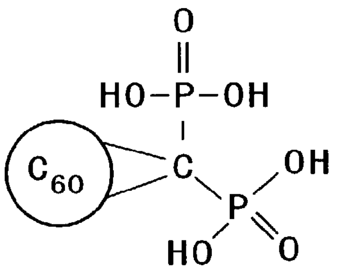
FIGS. 2A and 2B show a general scheme of the proton conductor (FIG. 2A) and a reaction scheme (FIG. 2B) of an example of a method for manufacturing the proton conductor according to an embodiment of the present invention.

FIG. 2A represents a general scheme of the derivative serving as the proton conductor according to an embodiment of the present invention, which is expressed by the molecular formula (1), i.e. $C_{60}{=}(C(PO(OH)_2)_2)_n$ (where n=2).

As shown in FIG. 2A, to the carbon atoms to constitute the fullerene molecule ($C_{60}$), serving as the base material where the functional groups are to be introduced, the functional groups are bonded via a tricyclic structure. As a result, chemical stability of the material is extensively improved and the material has high heat-resistant property. Also, the radical —$PO(OH)_2$ is used as the group with proton-dissociating property. Because the number of the protons to be dissociated per each functional group bonded to the fullerene molecule is four, it is possible to attain high proton conductivity.

Figure 2B:
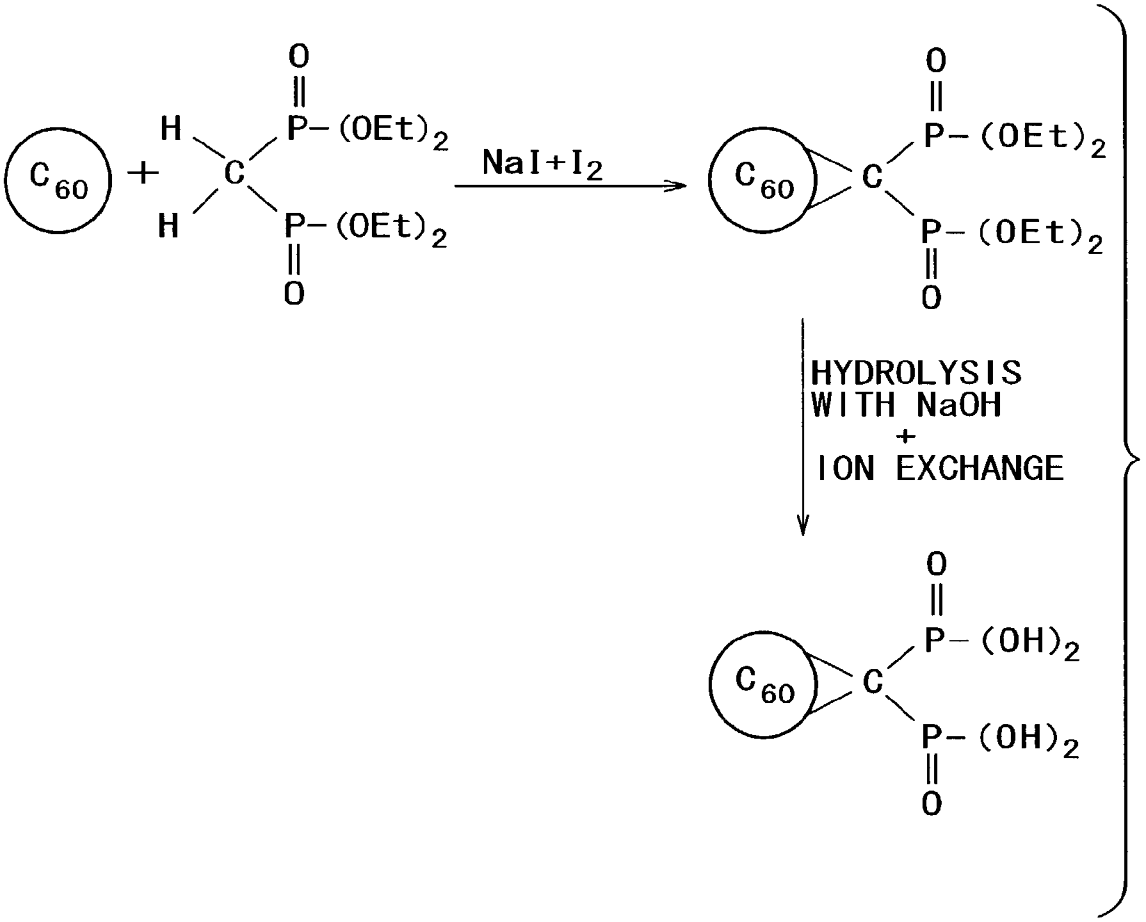

The method for manufacturing the proton conductor of the present invention as shown in FIG. 2A can be expressed, for instance, by the reaction scheme shown in FIG. 2B.

First, the fullerene molecule ($C_{60}$) and tetraethyl methylene diphosphonate are allowed to react under the presence of iodine and NaI. Then, it is possible to obtain a derivative where the functional group with ester group serving as a precursor of the group with proton-dissociating property is bonded to the fullerene molecule via the tricyclic structure.

Next, the derivative thus obtained is hydrolyzed using alkali hydroxide, e.g. sodium hydroxide. Then, the hydrolyzed product is subjected to ion exchange, and the proton conductor of the present invention can be obtained, in which the functional groups having the radial —$PO(OH)_2$ as the group with proton-dissociating property are bonded to the fullerene molecule ($C_{60}$) via tricyclic structure.

According to the manufacturing method in an embodiment of the present invention, it is possible to manufacture the proton conductor of the present invention having excellent properties in easy and efficient manner and to reduce the manufacturing cost. Also, it is possible to synthesize the product on mass-production basis.

The proton conductor of the present invention can be used in various types of electrochemical devices. Specifically, in a basic structure having a first electrode, a second electrode, and a proton conductor sandwiched between these two electrodes, the proton conductor of the present invention can be preferably applied to the proton conductor.

In an embodiment, the proton conductor of the present invention can be applied to an electrochemical device where the first electrode and/or the second electrode is a gas electrode, or to an electrochemical device where an active material electrode is used as the first electrode and/or the second electrode.

Description will be given below on examples where the proton conductor of the present invention is applied to a fuel cell where fuel is supplied to the first electrode and oxygen is supplied to the second electrode.

Figure 3:
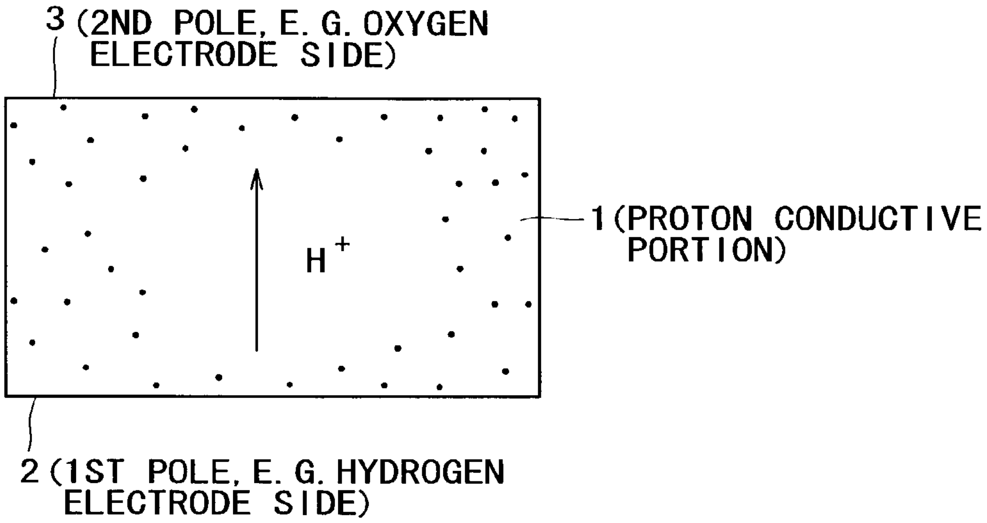
FIG. 3 is a schematic drawing showing a mechanism of proton conduction in a fuel cell according to an embodiment of the present invention.

The mechanism of the proton conduction in the fuel cell is as schematically shown in FIG. 3. A proton conductive portion 1 is sandwiched between the first electrode (e.g. hydrogen electrode) 2 and the second electrode (e.g. oxygen electrode) 3. The dissociated protons ($H^+$) are moved from the first electrode 2 toward the second electrode 3 in arrow direction.

Figure 4:
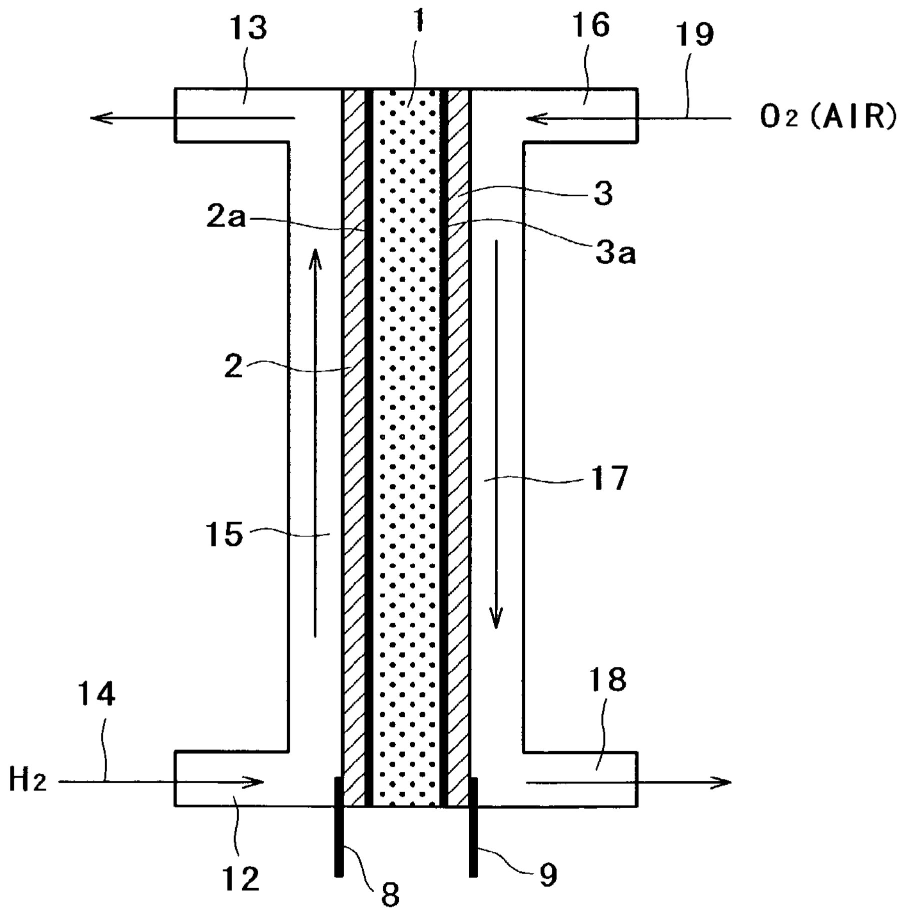
FIG. 4 is a schematic cross-sectional view of an example of a fuel cell according to an embodiment of the present invention.

FIG. 4 shows a concrete example of a fuel cell using the proton conductor of the present invention. The fuel cell has a negative electrode (fuel electrode or hydrogen electrode) 2 and a positive electrode (oxygen electrode) 3 with terminals 8 and 9 respectively and opposing to each other and having a catalyst 2*a* and a catalyst 3*a* closely fitted or dispersed, and a proton conductive portion 1 is sandwiched between the two electrodes. When in use, hydrogen is supplied through an inlet 12 on the negative electrode 2 side, and it is discharged through an outlet 13 (which may not be provided). While the fuel ($H_2$) 14 is passed through a passage 15, protons are generated. These protons are moved toward the positive electrode 3 together with the protons generated at the proton conductive portion 1. Then, the protons react with oxygen (air) 19, which is supplied through an inlet 16 and is directed toward an outlet 18 though a passage 17. As a result, electromotive force as desired is obtained.

In the fuel cell with the arrangement as described above, protons are dissociated at the proton conductive portion 1, and the protons supplied from the negative electrode 2 are moved toward the positive electrode 3, and this makes it possible to provide higher proton conductivity. Therefore, no additional apparatus such as humidifier is required, and this makes it possible to design the system in simplified and lightweight construction.

Figure 5B:
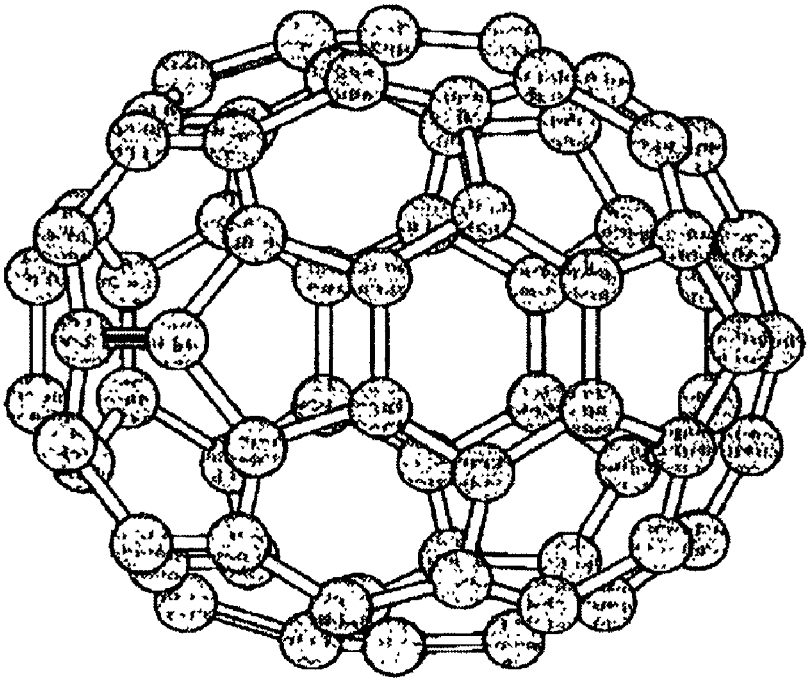
FIGS. 5A and 5B represent schematic drawings showing fullerene molecules, which serve as base materials in a proton conductor according to an embodiment of the present invention.
Figure 5A:
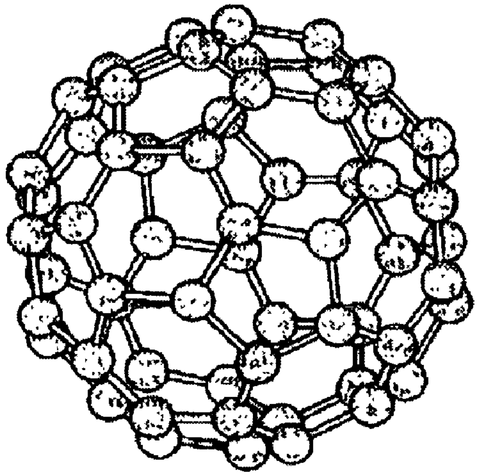

There is no special restriction on the fullerene molecule, serving as the base material where the functional groups are to be introduced so far as it is a spherical cluster molecule. In general, a fullerene molecule selected from $C_{36}$, $C_{60}$, (FIG. 5A), $C_{70}$ (FIG. 5B) $C_{76}$, $C_{78}$, $C_{80}$, $C_{82}$, $C_{84}$, $C_{86}$, $C_{88}$, $C_{90}$, $C_{92}$, $C_{94}$, $C_{96}$, the like or a mixture of two types or more of these molecules is preferably used.

These fullerene molecules were discovered in mass analysis spectrum of cluster beam by laser ablation of carbon. (Kroto, H. W; Heath, J. R.; O'Brien, S. C.; Curl, R. F; Smalley, R. E.: Nature, 1985; 318, 162.). The manufacturing method of same has been established. For example, the manufacturing method based on arc discharge of carbon electrode has been established to date. Attention also has been focused on the fullerene as the material of carbon semiconductor.

For instance, when a large quantity of the derivatives are aggregated, which are obtained by bonding the functional group to the fullerene molecule via a cyclic structure of tricyclic or more, the proton conductive property provided with the derivatives as bulk can be continuously used even at low humidity atmosphere because protons derived from the group with proton-dissociating property originally contained in the molecule are directly involved in the migration.

The fullerene molecule as described above particularly has electrophilic property, and this seems to extensively contribute to the promotion of ionizing or electrolytic dissociation of hydrogen ions in the group with proton-dissociating property with high acidity, and it exhibits high proton conductive property. Also, a considerable number of functional groups can be bonded to one fullerene molecule via cyclic structure of tricyclic or more. As a result, the number of protons related to the conduction per unit volume of the conductor is extremely increased, and this contributes to the attainment of higher conductivity.

The derivative serving as the proton conductor according to the present invention has carbon atoms of the fullerene molecules in almost all cases. It is lightweight, resistant to deterioration and contains no contaminated substance. The manufacturing cost of the fullerene molecule is now being rapidly decreased. From the viewpoints of resource, environment and economy, the fullerene molecule is regarded as a virtually ideal carbon material, being better than any other types of material.

The fullerene derivative thus obtained can be produced in form of film by coating, rolling or other film-forming method, and this can be applied to the proton conductor to be used in the electrochemical device of the present invention.

The proton conductor may substantially have the fullerene derivative only or it may be bonded using a binder. Further, two or more fullerene derivatives may be bonded together directly or indirectly, and a polymer may be formed.

In case the proton derivative substantially has the fullerene derivative only, the fullerene derivative may be press-molded to a film-like proton conductor, and this can be used. When the fullerene derivative bonded together using the binder is used as the proton conductor, it is possible to form the proton conductor with high strength by using the binder.

As the macromolecular material to be used as the binder, one type or two types or more of the polymers having the film-forming property publicly known may be used. The proton conductor of this type can also provide the same proton conductive property as that of the proton conductor, which has only the fullerene derivative.

Moreover, unlike the case where the fullerene derivative is used alone, the film-forming property derived from the macromolecular material is provided. Compared with the powder compressed molded product of the fullerene derivative, it has higher strength and high gas-permeation preventing ability, and it can be used as a flexible proton conductive thin-film (normally, with thickness of not more than 300 micrometers).

There is no special restriction on the macromolecular material so far as it does not inhibit proton conductive property (by reaction with the fullerene derivative) and has good film-forming property. Normally, the material having no electronic conduction property and having good stability is used. For example, polyfluoroethylene, polyvinylidene fluoride, polyvinyl alcohol, the like or combinations thereof may be preferably used. These are preferable to use as the macromolecular materials also from the reasons given below.

First, polytetrafluoroethylene is preferably used because, only using a small quantity, it can easily form thin film with higher strength compared with other types of macromolecular materials. In this case, the mixing quantity is not more than about 3 weight %, or more preferably about 0.5 to about 1.5 weight %. The thickness of the thin film can be normally as thin as about 100 micrometers to about 1 micrometer Further, polyvinylidene fluoride or polyvinyl alcohol is preferably used because it is possible to obtain proton conductive thin film having excellent gas-permeation preventing ability. The mixing quantity in this case is preferably in the range of about 5 to about 15 weight %.

Whether it is polyfluoroethylene or polyvinylidene fluoride or polyvinyl alcohol, if the mixing quantity is lower than the lower limit of the range as given above, sufficient film-forming strength may not be provided.

To obtain the thin film of the proton conductor of the present invention, produced by bonding the fullerene derivative using binder, press molding, extrusion molding, or other film-forming method already known may be used.

The electrochemical device according to the present invention can provide full functions in atmospheric air. Thus, electrochemical energy can be efficiently obtained without adjusting pressure, temperature, humidity, or the like when it serves as the fuel cell.

Also, the derivative is obtained by bonding the functional groups to the carbon atoms (which constitute the fullerene molecule) via the cyclic structure of tricyclic or more, and this is used as the composite material of the proton conductor. Accordingly, unlike the case where $H_3O^+$ ion conductor NAFION is used, it can fulfill the function without requiring humidifier or in atmospheric air and under low humidity condition.

Specifically, electrochemical energy can be obtained in the atmospheric air under low humidity condition, and not much time is required until steady operation is reached. This can make the starting operation faster when it is used as the fuel cell. The humidifier may be provided and the operation may be performed under the presence of moisture, but no such condition is required in the present invention.

When $H_3O^+$ ion conductor NAFION is used, in addition to the water generated at the generation of electrochemical energy, water generated by migration is present at the positive electrode, and dehumidifier is required. In the embodiment of the present invention, hydrogen gas is supplied to the negative electrode side and electrolysis is performed. The protons generated by electrolysis are moved toward the positive electrode via the proton conductor of the present invention and are allowed to react with oxygen, and electrochemical energy can be obtained. Accordingly, electrochemical energy can be generated without requiring dehumidifier.

Therefore, the electrochemical device of the present invention is a device in compact size and suitable for general-purpose application.

In the present invention, instead of the derivative using the fullerene molecule as the base material, cluster derivative may be used. For instance, a cluster having carbon powder is obtained by arc discharge method of carbon electrode, and the functional groups are bonded to the cluster via cyclic structure of tricyclic or more.

Here, the cluster normally means an aggregate, which has several to several hundreds of atoms bonded or aggregated together. Proton conductive performance is improved by this aggregate, and high film strength can be provided while maintaining good chemical property, and layers can be easily formed. Also, the cluster has carbon atoms as main components. It is an aggregate where several to several hundreds of carbon atoms are bonded together regardless of the type of carbon-carbon bonding. However, it does not necessarily have carbon cluster by 100%, and other types of atoms may be mixed. Including such case, an aggregate where carbon atoms are present as majority is called as a carbon cluster.

The main component of the proton conductor according to the present invention is a substance, which is obtained by bonding the functional group to the carbon cluster serving as the base material via a cyclic structure of tricyclic or more. In this respect, protons can be easily dissociated under dry condition, and the effects similar to the proton conductor having fullerene derivative as described above can be provided including the proton conductive property. Moreover, many types of carbonaceous materials are included in the category of the carbon cluster, and carbonaceous materials can be selected from the materials in much wider range.

In this case, the carbon cluster is used as the base material. A large quantity of the functional group having a group of proton-dissociating property must be bonded in order to provide better proton conductive property, and this can be accomplished by the carbon cluster. However, this makes the acidity of solid proton conductor extremely higher. Unlike normal carbonaceous material, carbon cluster is resistant to oxidizing, deterioration and has high durability. The atoms are closely bonded together. Thus, even when the acidity is high, the bonding between the atoms is not broken up (i.e. highly resistant to chemical change), and film structure can be maintained well.

The proton conductor with the above arrangement can provide high proton conductive property even under dry condition. As shown in FIG. 6 to FIG. 9, there are various types, and it can be selected from wide range of materials as the raw material of the proton conductor.

Figure 6:
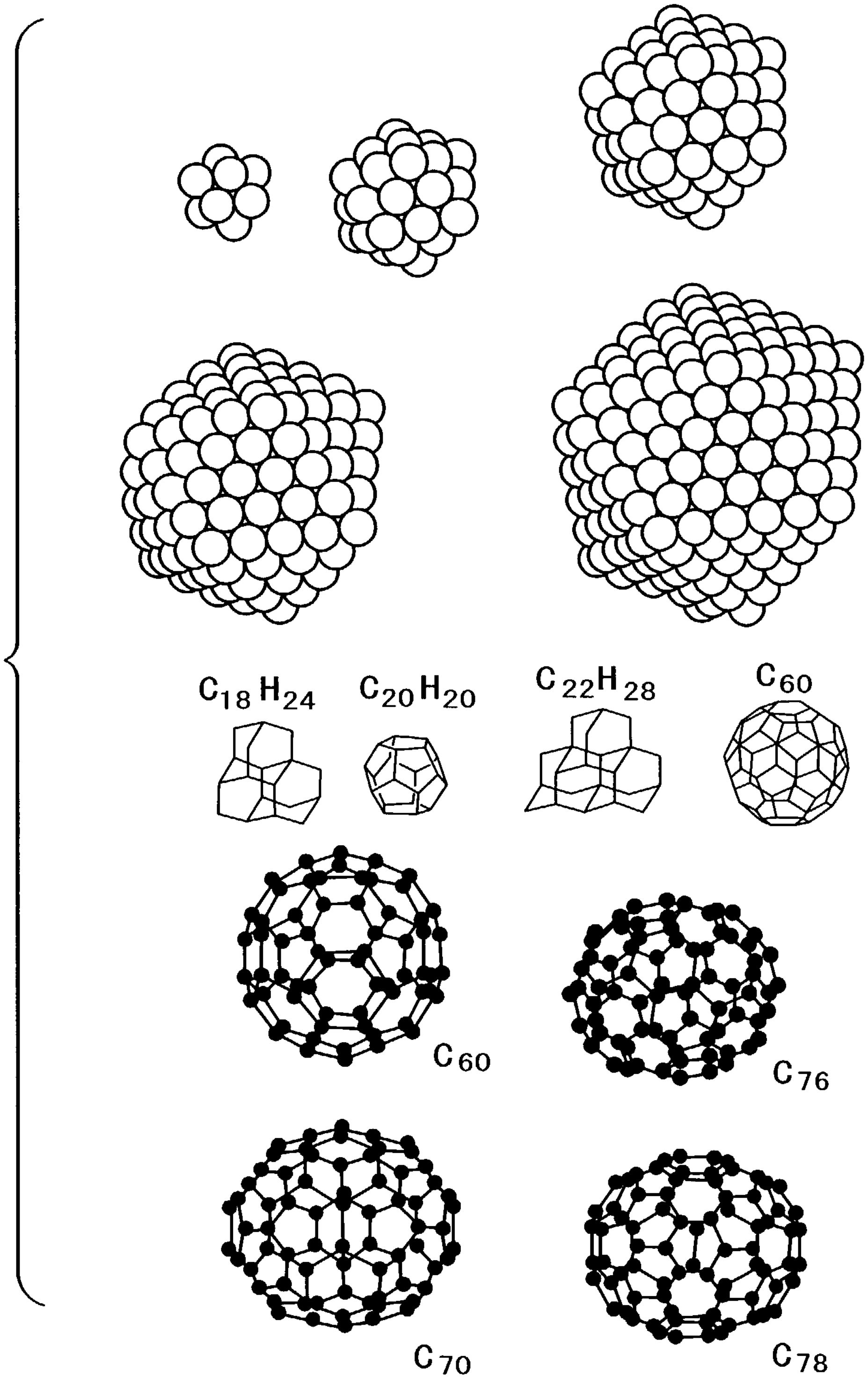
FIG. 6 shows various examples of carbon clusters, which serve as base materials in the proton conductor according to an embodiment of the present invention.
Figure 7:
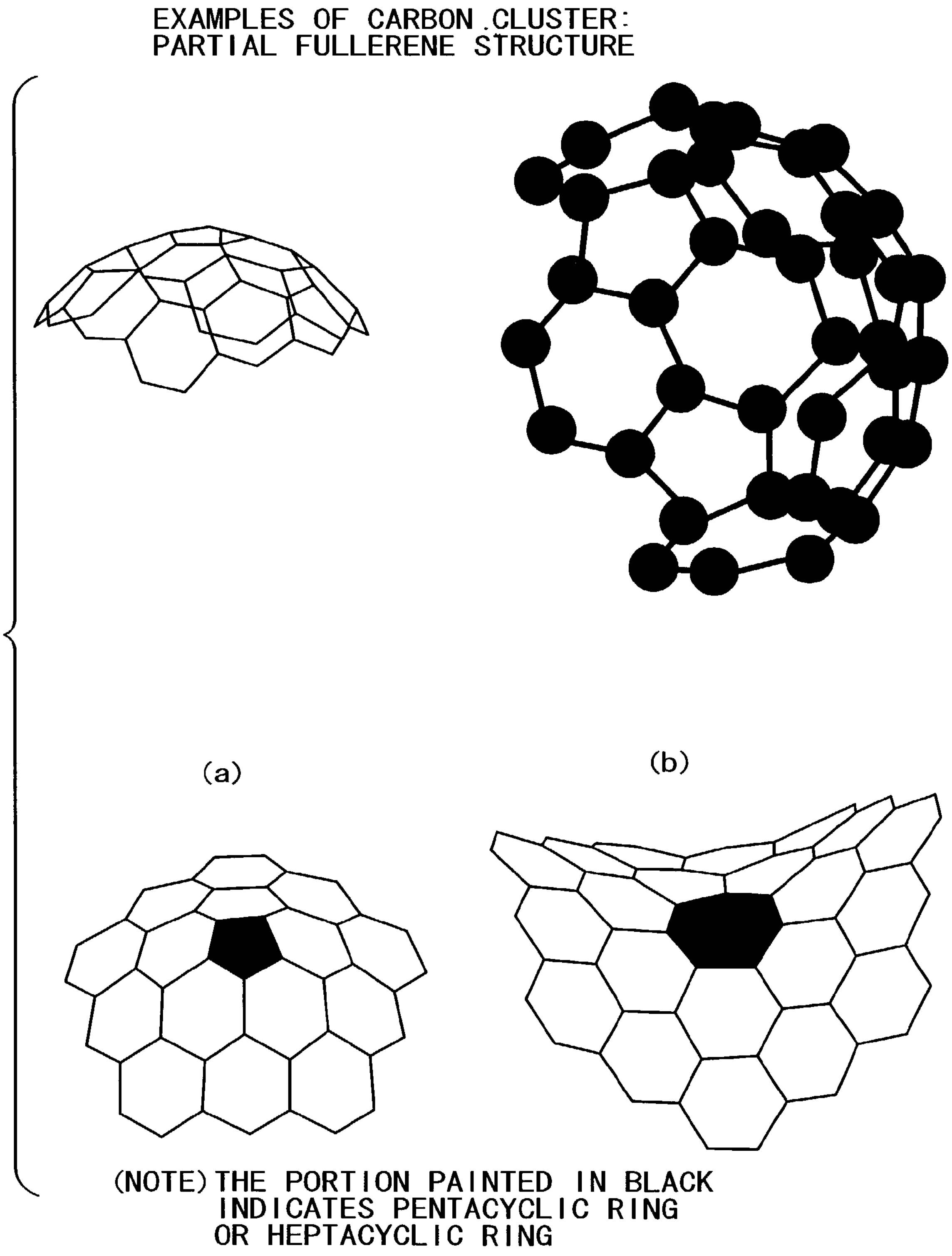
FIG. 7 shows schematic drawings of examples of carbon clusters including partial fullerene structures according to an embodiment of the present invention.

FIG. 6 shows various types of carbon clusters where a large number of carbon atoms are bonded together, showing spherical or elongated spherical shape or closed surface structure similar to these. (In the figure, molecular type fullerene is also shown.) In contrast, FIG. 7 shows various types of carbon clusters, in each of which a part of the spherical structure is missing. In this case, the cluster is characterized in that there is an open end in the structure. Such structures are often seen as side products in the process to manufacture the fullerene by arc discharge. When carbon atoms in most of the carbon clusters have SP3-bonding, this leads to various types of clusters having diamond structure as shown in FIG. 8.

The cluster where most of the carbon atoms are bonded by SP2-bonding has plane structure of graphite, or it has the whole or a part of the structure of fullerene or nanotube. The cluster having the structure of graphite has electronic conductive property in the cluster, and this is not preferable to use as the base material of the proton conductor.

In contrast, SP2-bonding of fullerene or nanotube partially contains the features of SP3-bonding and often has no electronic conductive property. Thus, it is preferable to use as the base material of the proton conductor.

Figure 9:
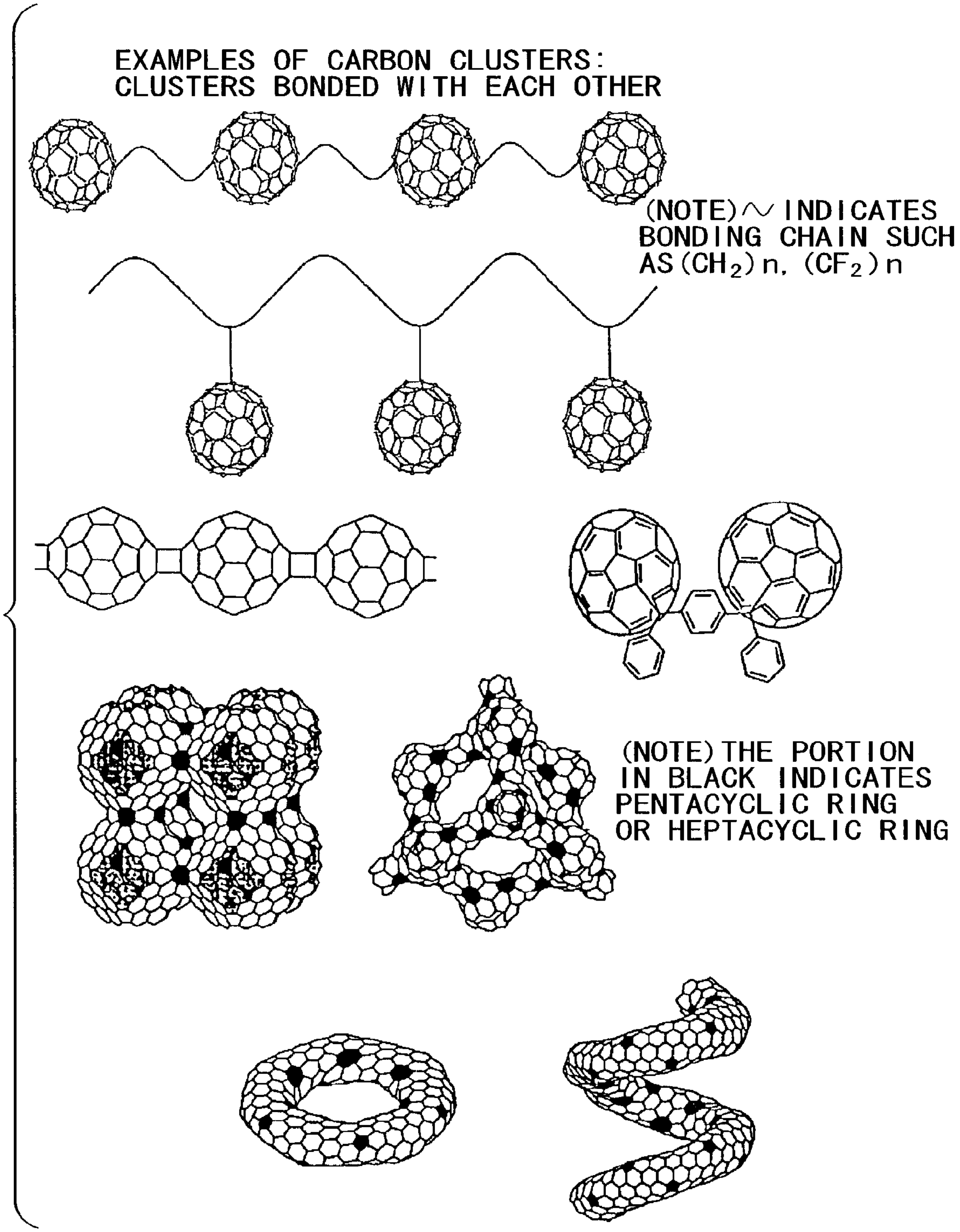
FIG. 9 represents schematic drawings of carbon clusters including clusters bonded to each other according to an embodiment of the present invention.

FIG. 9 shows various cases where the clusters are bonded with each other, and these types of structures can also be applied in the present invention.

The carbon cluster derivative can be directly press-molded in form of film or pellet without binder. In the present invention, the carbon cluster serving as the base material has preferably a length of not more than 100 nm, or more preferably not more than about 100 angstroms. The number of the groups to be introduced is preferably 2 or more.

Further, as the carbon cluster, it is preferable to use a cage-like structure (such as the fullerene molecule as described above) or a structure having an open end at least on a part of it. Such fullerene of defective structure has reactivity of the fullerene molecule, and the missing portion, i.e. open portion, has higher reactivity. Therefore, the introduction of the functional groups with the group with proton-dissociating property can be promoted, and high functional group introducing ratio and higher proton conductive property can be obtained. Compared with the fullerene molecule, this can be synthesized in larger quantity, and this results in the production at very low cost.

On the other hand, it is preferable to use a structure of tubular or linear carbon structure as the base material of the proton conductor of the present invention. As the tubular carbon structure, tube-like structure, e.g. carbon nanotube, may be preferably used. Also, as the linear carbon structure, fiber-like structure, e.g. carbon fiber, may be preferably used.

In the carbon nanotube or the carbon fiber, electrons can be easily discharged because of the structure, and surface area can be extremely increased. This contributes to the improvement of proton propagation efficiency.

The carbon nanotube or the carbon fiber preferably used in this case can be manufactured by arc discharge method, chemical vapor phase growing method (thermal CVD method) or other suitable processes.

In the arc discharge method, for instance, a metal catalyst, such as FeS, Ni, Co, or the like is used, and synthesis is performed under helium atmosphere (e.g. 150 Torr) using an arc discharge chamber. The material is attached on inner wall of the chamber in cloth-like form by arc discharge, and the carbon nanotube can be obtained. When the above catalysts are used together, the carbon nanotube with smaller diameter can be obtained. When arc discharge is performed without catalysts, a carbon nanotube of multi-layer type with larger diameter can be prepared.

Figure 10A:
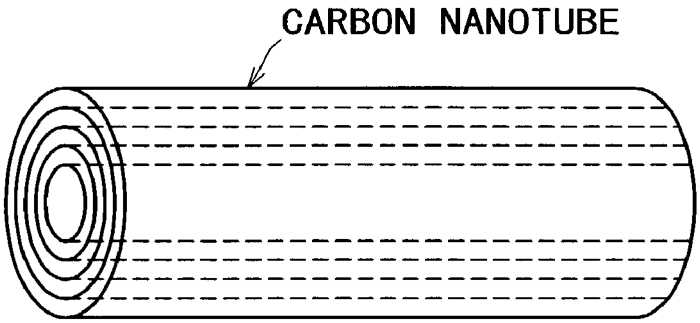
FIGS. 10A–10C represent drawings of carbon nanotube and carbon fibers, which serve as base materials for the proton conductor according to an embodiment of the present invention.
Figure 10B:
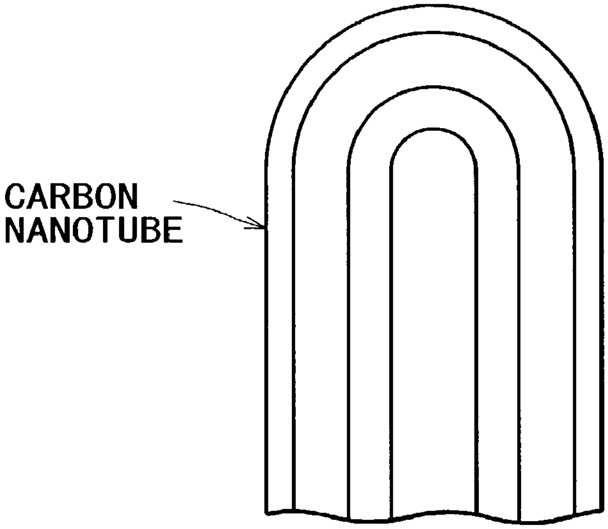
Figure 10C:
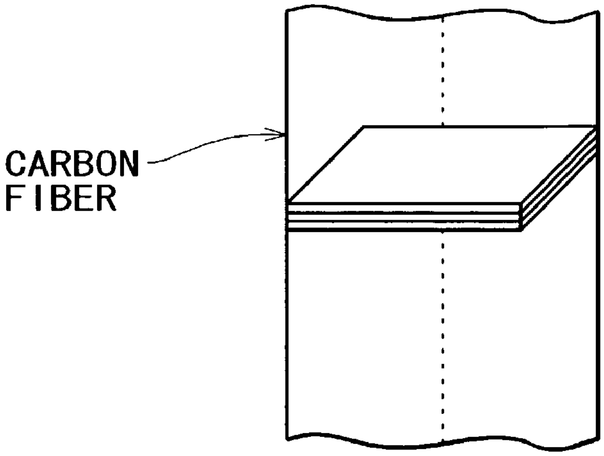

As described above, the material can be formed by arc discharge without a catalysts. The graphene structure (cylindrical structure) of multi-layer nanotube as shown in the perspective view of FIG. 10A and the partial cross-sectional view of FIG. 10B represents a carbon nanotube with high quality and without defect. It is known that this is a material with very high performance characteristics as electron releasing material.

As described above, the derivative is obtained by bonding the functional group with a group with proton-dissociating property to the carbon nanotube obtained by arc discharge method via a cyclic structure of tricyclic or more, and this derivative also has high proton conductive property even under dry condition.

The chemical vapor phase growing method is a method to synthesize the carbon nanotube or the carbon fiber by the reaction of transition metal particles with hydrocarbon such as acetylene, benzene, ethylene, CO or the like. A transition metal substrate or a coated substrate is allowed to react with hydrocarbon or CO gas, and the carbon nanotube or the carbon fiber are stacked on the substrate.

For instance, a Ni substrate is placed in an alumina tube heated at 700° C., and when this is allowed to react with toluene/$H_2$ gas (e.g. 100 seem), it is possible to obtain the carbon fiber having a structure as shown in the perspective view of FIG. 1C.

In this case, it is preferable that aspect ratio of the carbon nanotube is in the range of 1:1000 to 1:10, and that aspect ratio of the carbon fiber is in the range of 1:5000 to 1:10. Also, it is preferable that diameter of the tubular or linear carbon structure is in the range of about 0.001 to about 0.5 micrometers and that its length is within the range of about 1 to about 5 micrometers.

Description will be given below on the present invention referring to embodiments of the invention by way of example and not limitation:

EXAMPLE 1

<Synthesis of Phosphoric Acid Type Fullerene Derivative ($C_{60}$=C(PO(OH$_2$)$_2$)>

First, a precursor $C_{60}$=C(PO(OEt)$_2$)$_2$ of a phosphoric acid type fullerene derivative was synthesized referring to the literature (Cheng, F; Yang, X; Zhu, H; and Song, Y: Tetrahedron Letters 41 (2000), pp.3947–3950). First, 1 g (1.39 mmol) of $C_{60}$ was dissolved in 600 ml of dehydrated toluene. Then, 353 mg (1.39 mmol) of iodine and 2 g of NaI were added. By stirring up, 0.338 ml (1.39 mmol) of tetraethyl methylene diphosphonate was added. Under argon gas atmosphere, the mixture was stirred up at room temperature for 24 hours and was then filtered. The precipitate was rinsed with a large quantity of $CHCl_3$. The solution thus obtained was dried in a rotary evaporator and was rinsed with a large quantity of alcohol. When the precipitate thus rinsed was dried up, a precursor $C_{60}$=C(PO(OEt)$_2$)$_2$ of the phosphoric acid type fullerene derivative was obtained.

Then, 1 g of the precursor $C_{60}$=C(PO(OEt)$_2$)$_2$ of the phosphoric acid type fullerene derivative thus obtained was weighed, and this was stirred up in 50 ml of 1M NaOH solution at 60° C. for one hour to 30 hours for hydrolysis. When the solution thus obtained was subjected to proton ion exchange, phosphoric type fullerene derivative $C_{60}$=C(PO(OH)$_2$)$_2$ was obtained.

The above synthetic reaction can be expressed as follows:

$C_{60}+CH_2(PO(OEt)_2)_2 \rightarrow C_{60}=C(PO(OEt)_2)_2$
$\rightarrow C_{60}=C(PO(ONa)_2)_2$
$\rightarrow C_{60}=C(PO(OH)_2)_2$ The number of the functional groups, which can be bonded to one fullerene cage as the base material can be controlled in the range of 1 to 30 by adjusting molar ratio of the fullerene raw material for synthesis and the other raw materials added to it. For instance, it is possible to add the above functional groups to all of the double bonds on fullerene molecule. The more the number of the functional groups on the fullerene molecule is, the more the number of protons is increased, and the more the conductivity is increased.

FIG. 11 shows the results of measurement for FT-IR of the phosphoric acid type fullerene derivative $C_{60}$═$C(PO(OH)_2)_2$obtained above. As shown in FIG. 11, strong peaks at 3440 $cm^{-1}$ and 1650 $cm^{-1}$ respectively appear to be the peaks due to the stretching vibration of O—H of water. Also, the peak at 1723 $cm^{-1}$ appears to be the peak when —OH group is directly bonded to $C_{60}$ when the specimen is hydrolyzed in NaOH. Further, strong and sharp peaks at 1210 $cm^{-1}$ and 1042 $cm^{-1}$ appear to be the peaks due to P═O and P—O.

EXAMPLE 2

<Synthesis of Phosphoric Acid Type Fullerene Derivative $C_{60}$═$(C(PO(OH)_2)_2)_2$>

First, 1 g (1.39 mmol) of $C_{60}$ was dissolved in 600 ml of dehydrated toluene, and 706 mg (2.78 mmol) of iodine and 4 g of NaI were added. While stirring up, 0.676 ml (2.78 mmol) of tetraethyl methylene diphosphonate was added. Under argon gas atmosphere, the mixture was stirred up at room temperature to 50° C. for 24 to 72 hours and was filtered. The precipitate was rinsed with a large quantity of $CHCl_3$. The solution thus obtained was dried up in a rotary evaporator and was rinsed with a large quantity of alcohol. When the rinsed precipitate was dried up, a precursor $C_{60}$═$(C(PO(OEt)_2)_2)_2$ of the phosphoric acid type fullerene derivative was obtained.

Next, 1 g of the precursor $C_{60}$═$(C(PO(OEt)_2)_2)_2$ of the phosphoric acid type fullerene derivative obtained above was weighed, and this was hydrolyzed in 50 ml of 1M NaOH solution at 100° C. for one hour to 30 hours. The solution thus obtained was subjected to proton ion exchange, and a phosphoric acid type fullerene derivative $C_{60}$═$(C(PO(OH)_2)_2)_2$ was obtained.

The above synthetic reaction can be expressed as follows:

$C_{60}+2CH_2(PO(OEt)_2)_2 \rightarrow C_{60}{=}(C(PO(OEt)_2)_2)_2$
$\rightarrow C_{60}{=}(C(PO(ONa)_2)_2)_2$
$\rightarrow C_{60}{=}(C(PO(OH)_2)_2)_2$ The result of measurement of FT-IR of the phosphoric acid type fullerene derivative $C_{60}$═$(C(PO(OH)_2)_2)_2$ showed main peaks similar to those peaks shown in FIG. 11 as prepared in Example 1.

EXAMPLE 3

<Thermal Analysis of the Phosphoric Acid Type Fullerene Derivatives of Examples 1 and 2>

To determine thermal stability in each of the phosphoric acid type fullerene derivatives obtained in Examples 1 and 2, TG-DTA and RGA (residual gas analysis) were performed.

TG Measurement

TG-DTA measurement was performed on the phosphoric acid type fullerene derivative (the ratio of $C_{60}$>C<$(PO(OH)_2)_2$ ($C_{60}$) to >C<$(PO(OH)_2)_2$ was 1:1). The measurement was performed under dry air atmosphere with temperature increase rate of 5° C./min. The results are summarized in FIG. 12. As it is evident from FIG. 12, weight decrease occurs in nearly three stages. Weight decrease from room temperature to the temperature of about 300° C. was caused by water. Weight decrease from about 300° C. to 400° C. was estimated to be the result of decomposition of the specimen. The final weight decrease was estimated to be the result of decomposition of fullerene.

RGA Measurement

Figure 13:
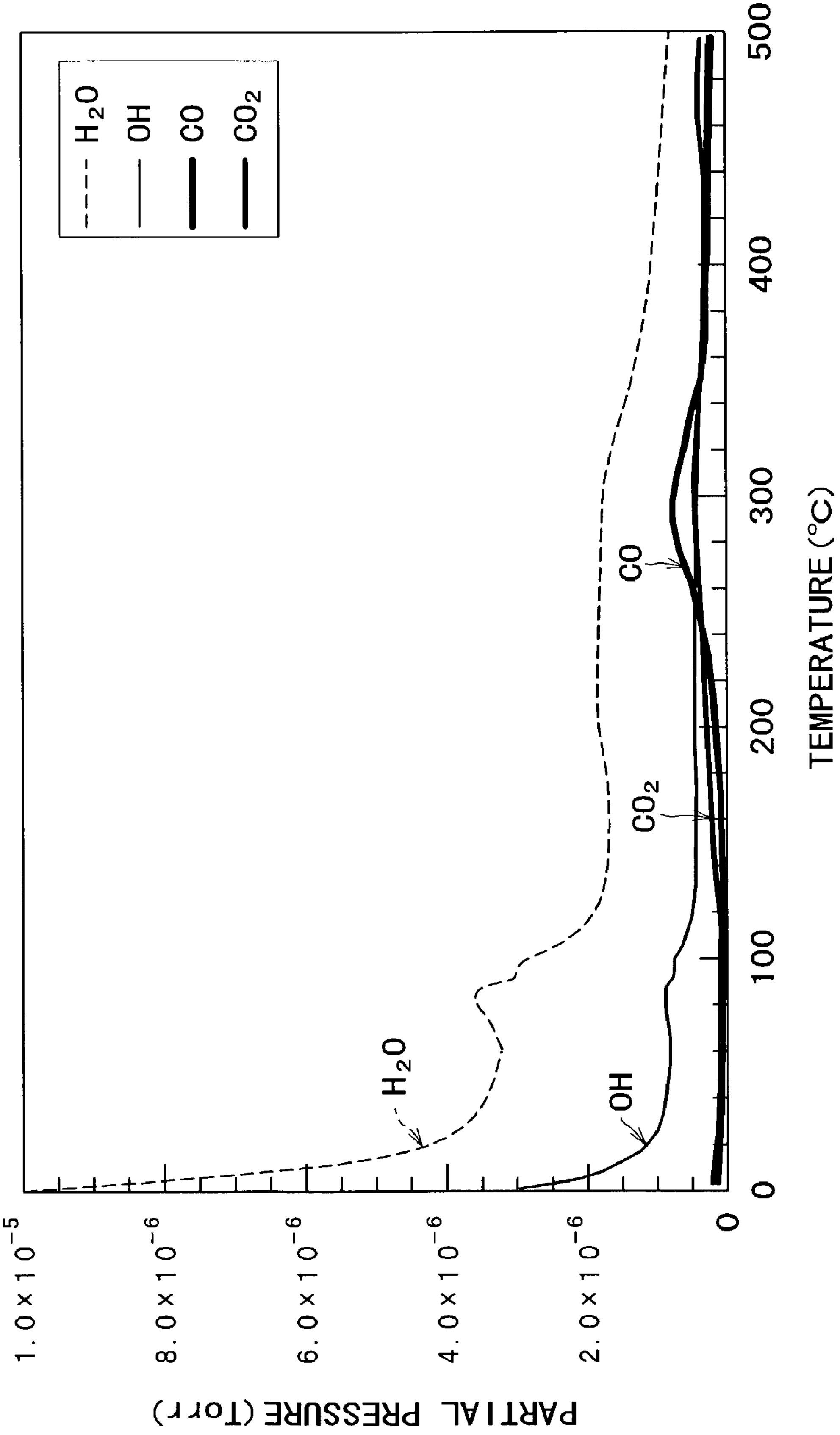
FIG. 13 is a graph showing measurement results of RGA according to an embodiment of the present invention.

The RGA measurement is the measurement of gas release from the decomposition of the specimen. The measurement was performed under vacuum condition with temperature increase rate of 2° C./min. The results are shown in FIG. 13. The thin line at the uppermost portion of FIG. 13 represents partial pressure of water. $CO_2$ and CO were detected from 200° C. Also, the peak value of CO was obtained near 300° C.

Figure 12:
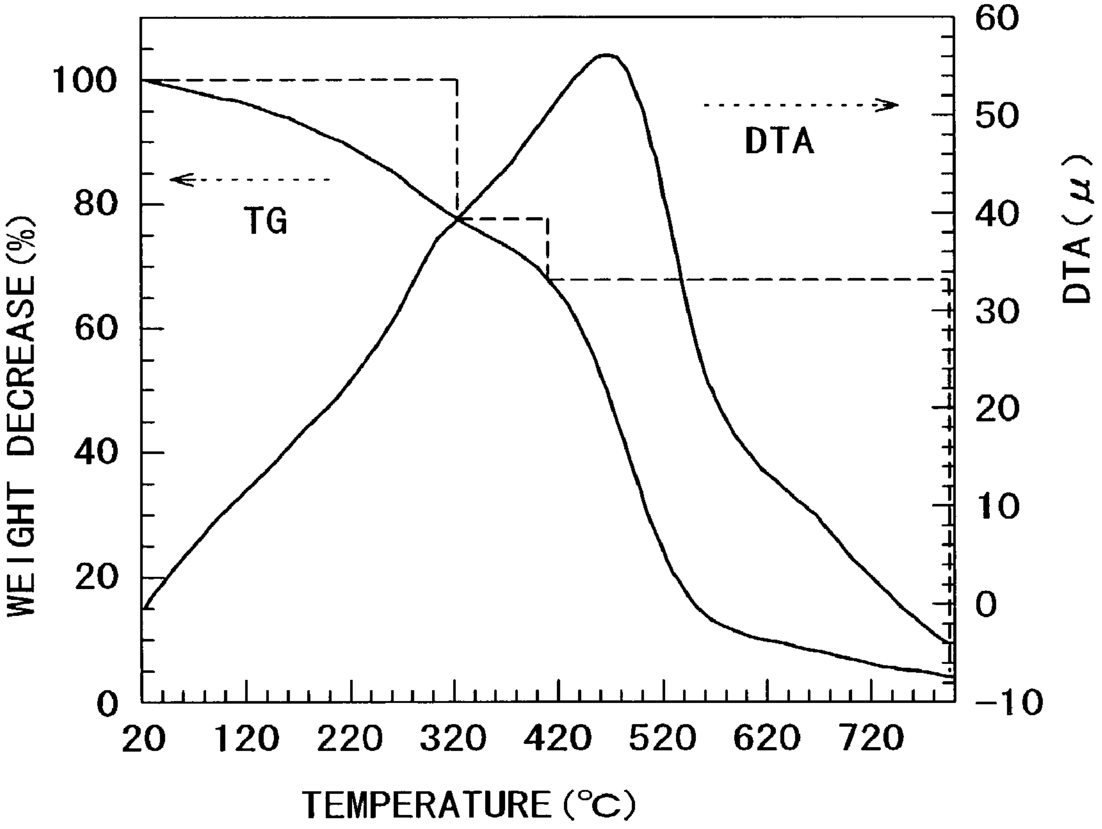
FIG. 12 is a graph showing measurement results of TG-DTA according to an embodiment of the present invention.

As it is evident from FIG. 12 and FIG. 13, based on the results of the measurement of TG and RGA, heat-resistant property of the phosphoric acid type fullerene derivative $C_{60}$>C<$(PO(OH)_2)_2$ was 200° C. or more. It appears that the specimen began to gradually decompose from 200° C., and the peak value was reached at 300° C.

EXAMPLE 4

<Preparation of Pellets of the Phosphoric Acid Fullerene Derivatives of Examples 1 and 2>

The powder of each of the phosphoric acid type fullerene derivatives obtained in Examples 1 and 2 was pressed in one direction so that pellets each in circular shape of 4 mm in diameter could be formed. Both of the phosphoric acid type fullerene derivatives have good moldability and could be palletized easily without using the materials such as binder resin. Each pellet was 300 micrometers in thickness, and we call the pellets as pellets of Examples 1 and 2 respectively.

EXAMPLE 5

<Measurement of Proton Conductivity of the Pellets of the Phosphoric Acid Type Fullerene Derivatives of Examples 1 and 2>

Figure 14:
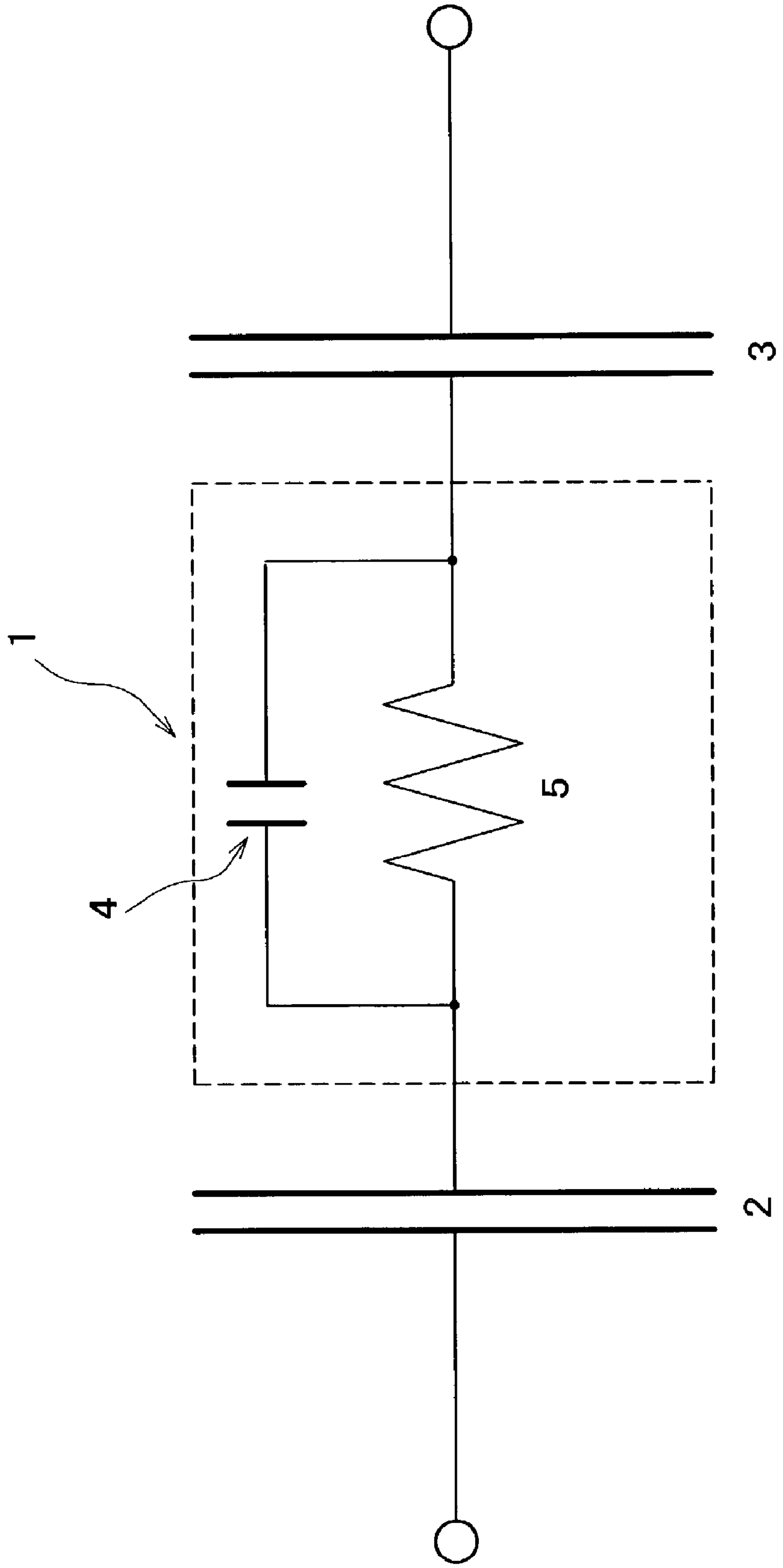
FIG. 14 is a diagram of an equivalent circuit according to an embodiment of the present invention.

Each side of each of the pellets of Examples 1 and 2 prepared in Example 4 was sandwiched by metal plates, and AC voltage of 0.1 V was applied. At the frequency of 7 MHz to 1 Hz, AC complex impedance was measured. The measurement was performed under atmospheric air without humidifying. For impedance measurement, the proton conductive portion 1 of the proton conductor, which has pellets of Examples 1 and 2, electrically constitutes an equivalent circuit as shown in FIG. 14. Including the proton conductive portion 1 expressed by a parallel circuit of a resistance 5 and a capacitance 4, the capacitance 4 and the resistance 5 are provided between a first electrode 2 and a second electrode 3. The capacitance 4 represents delay effect (phase delay in case of high frequency) when protons are moved. The resistance 5 represents a parameter of easy movement of proton.

Here, the measurement impedance Z is expressed by Z=Re(Z)+i·1m(Z), and frequency dependency of the proton conductive portion given by the equivalent circuit was determined.

Figure 15:
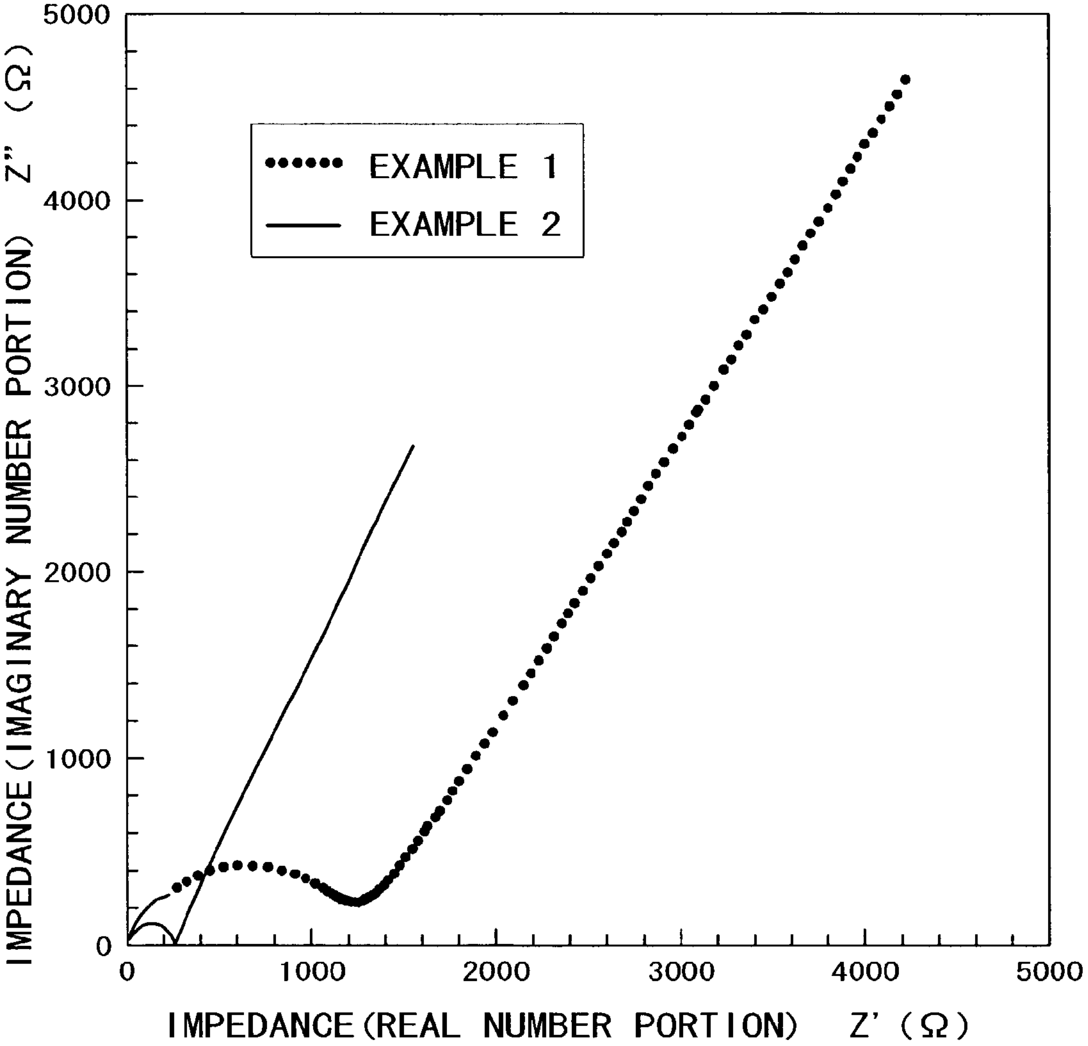
FIG. 15 is a graph showing measurement results of complex impedance of phosphoric acid type fullerene derivative aggregate pellets according to an embodiment of the present invention.

The proton conductivity by calculation from AC resistance obtained from call-call plot (FIG. 15) was as follows: $1.8\times10^{-4}$ S $cm^{-1}$ for the pellets of the phosphoric acid fullerene derivative of Example 1, and $8.4\times10^{-4}$ S $cm^{-1}$ for the pellets of the phosphoric acid type fullerene derivative of Example 2. The conductivity of the pellets of the phosphoric acid type fullerene conductor of Example 2 was higher, and this may be attributed to the fact that there were more functional groups bonded to the fullerene molecules as the base material, and this results in more protons.

EXAMPLE 6

<Synthesis of Precursor $C_{60}$=(C(PO(OEt)$_2$)$_2$)$_n$ of the Phosphoric Acid Type Fullerene Derivative>

First, 1 g (1.39 mmol) of $C_{60}$ was dissolved in 600 ml of dehydrated toluene. Then, 8.82 g (34.75 mmol) of iodine and 10 g of NaI were added. While stirring up, excessive quantity, i.e. 8.45 ml (34.75 mmol), of tetraethyl methylene diphosphonate was added. Under argon gas atmosphere, this was stirred up at room temperature to 50° C. for 24 to 72 hours and was filtered. The precipitate was rinsed with a large quantity of $CHCl_3$. The solution thus obtained was dried up in a rotary evaporator, and this was further rinsed with a large quantity of alcohol. When the precipitate thus rinsed was dried up, a precursor $C_{60}=(C(PO(OEt)_2)_2)_n$ of the phosphoric acid type fullerene derivative was obtained. On $C_{60}=(C(PO(OEt)_2)_2)_n$ thus prepared, MALDI-TOF-MS was performed. The value of n was 9 at maximum.

The above synthetic reaction can be expressed as follows:

$C_{60}+12CH_2PO(OEt)_2)_2 \rightarrow C_{60}=(C(PO(OEt)_2)_2)_{12}$

The number of the functional group, which can be bonded to the fullerene molecule (e.g. $C_{60}$) as the base material can be controlled in the range from 1 to 30 by adjusting molar ratio of the raw material serving as the base material during synthesis and the other raw material added to it. For instance, it is possible to add the functional groups to all of the double bonds on the base material. The more the number of the functional group on the base material is, the more the number of protons is increased, and the more the conductivity is increased.

EXAMPLE 7

<Synthesis (1) of Sulfonic Acid Type Fullerene Derivative ($C_{60}=(C(SO_3H)_2)_n$)>

First, 1 g (1.39 mmol) of $C_{60}$ was dissolved in 400 ml of dehydrated toluene, and 3.53 g (13.9 mmol) of iodine and 5 g of NaI were added. While stirring up, excessive quantity, i.e. 2.96 g (13.9 mmol), of methane disulfonic acid chloride $CH_2(SO_2Cl)_2$) was added. Under argon gas atmosphere, this was stirred up at room temperature from 24 to 96 hours. When unreacted impurities were rinsed with a large quantity of toluene, diethyl ether and hexane, a precursor $C_{60}=(C(SO_2Cl)_2)_n$ of sulfonic acid type fullerene derivative was obtained.

Next, 1 g of the precursor $C_{60}=(C(SO_2Cl)_2)_n$ of the sulfonic acid type fullerene derivative was weighed, and this was stirred up in 100 ml of 1M NaOH solution at room temperature for one hour to 30 hours for hydrolysis. The solution thus obtained was subjected to proton ion exchange, and the sulfonic acid fullerene derivative ($C_{60}=(C(SO_3H)_2)_n$) was obtained.

On the sulfonic acid type fullerene derivative ($C_{60}=(C(SO_3H)_2)_n$) obtained above, measurement was made by MALDI-TOF-MS and element analysis was performed. As a result, the value of n was 4 to 6.

Figure 16:
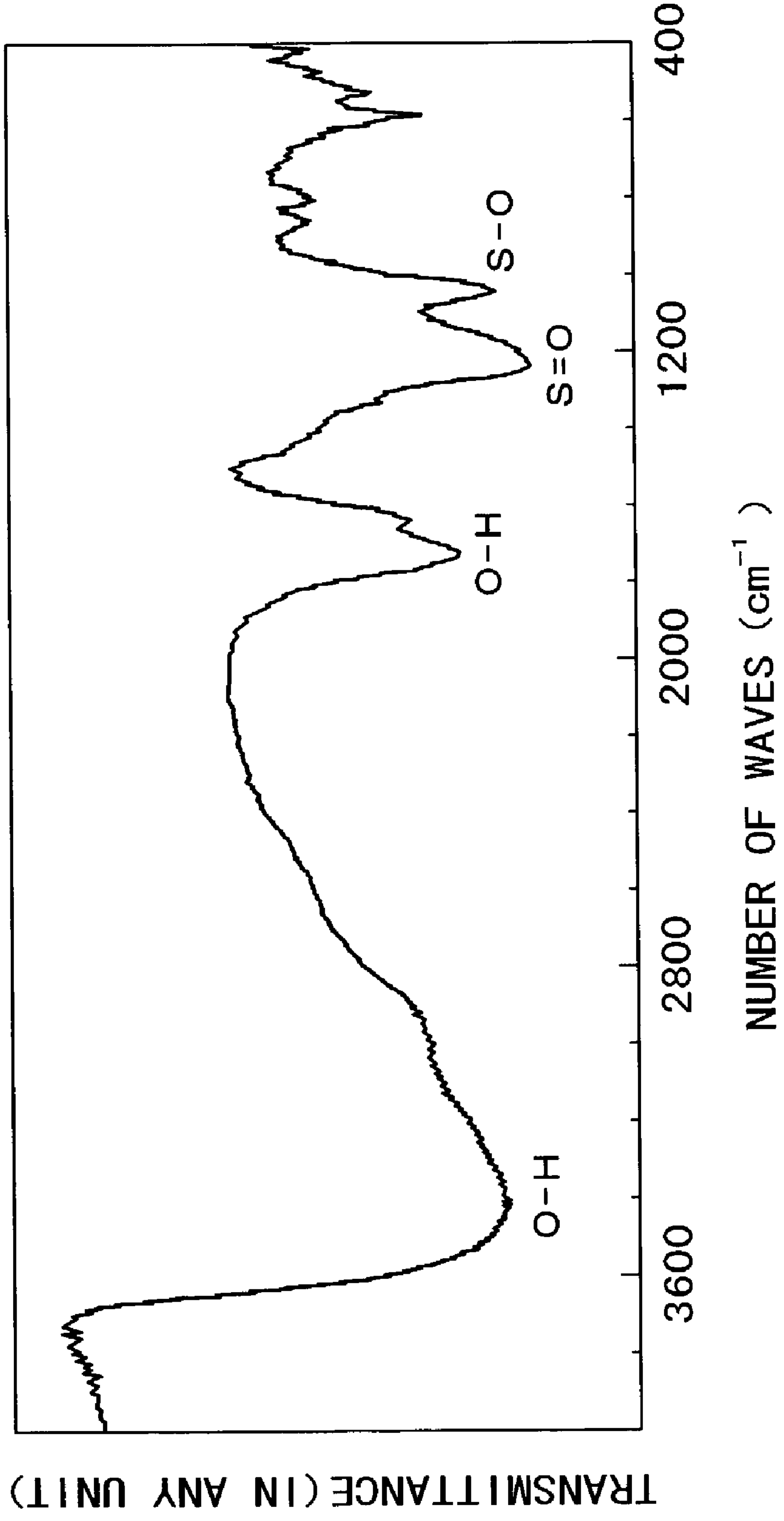
FIG. 16 is a graph showing measurement results of FT-IR according to an embodiment of the present invention.

The above synthetic reaction can be expressed as follows:

$C_{60}+{}_mCH_2(SO_2Cl)_2 \rightarrow C_{60}=(C(SO_2Cl)_2)_n$ $\rightarrow C_{60}=(C(SO_3Na)_2)_n$ $\rightarrow C_{60}=(C(SO_3H)_2)_n$ FIG. 16 shows the results of measurement of FT-IR on the sulfonic acid type fullerene derivative ($C_{60}=(C(SO_3H)_2)_n$) thus obtained. As it is evident from FIG. 16, strong peaks at 3436 $cm^{-1}$ and 1635 $cm^{-1}$ appear to be the peaks due to O—H of water. Also, a strong peak at 1720 $cm^{-1}$ appears to be the peak caused by direct bonding of —OH group with $C_{60}$ when the specimen was hydrolyzed in NaOH. Further, strong peaks at 1232 $cm^{-1}$ and 1026 $cm^{-1}$ seem to be the peaks due to S═O and S—O.

<Preparation of Pellets of the Sulfonic Acid Type Fullerene Derivative of Example 7 and Measurement of Proton Conductivity>

Pellets of the sulfonic acid type fullerene derivative of Example 7 were prepared by the same procedure as in Example 4. Each pellet had diameter of 4 mm and thickness of 1.12 mm. Each side of each pellet thus prepared was sandwiched by metal plates, and AC voltage of 0.1 V was applied on it. AC complex impedance was measured with frequency of 7 MHz to 1 Hz. The measurement was performed in the atmospheric air without humidifying.

Figure 17:
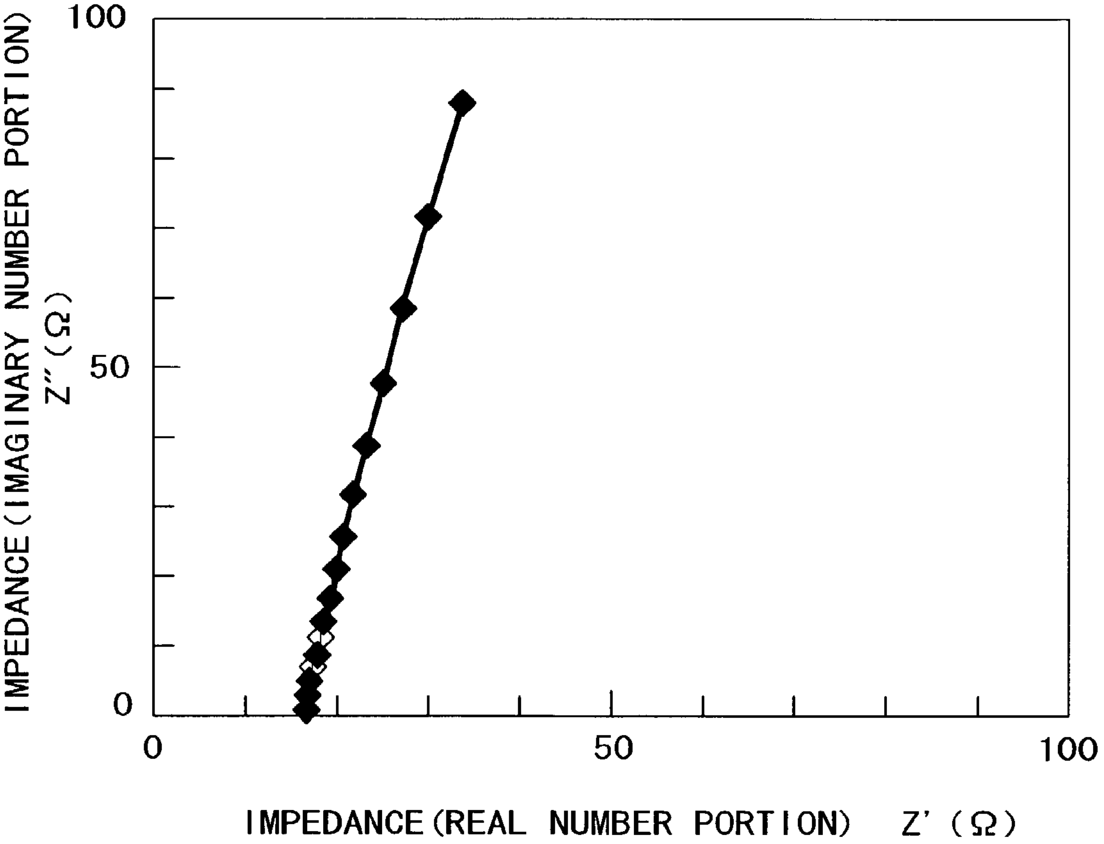
FIG. 17 is a graph showing measurement results of complex impedance of sulfonic acid type fullerene derivative aggregate pellets according to an embodiment of the present invention.

FIG. 17 shows a call-call plot. As shown in FIG. 17, linear call-call plot is a typical plot when proton conductivity of the specimen is high. The value of intersection of impedance real number portion is AC resistance. Proton conductivity calculated from this value was: $5.6\times10^{-2}$ S $cm^{-1}$. The conductivity was higher than that of the pellet of each of the phosphoric acid type fullerene derivatives of Examples 1 and 2, and this was attributed to the fact that there were more functional groups bonded to the fullerene molecule as base material, and hence, there were more protons.

EXAMPLE 8

<Synthesis (2) of Sulfonic Acid Type Fullerene Derivative ($C_{60}=(C(SO_3H)_2)_n$)>

First, 1 g (1.39 mmol) of $C_{60}$ was dissolved in 400 ml of dehydrated toluene, and 3.53 g (13.9 mmol) of iodine and 5 g of NaI were added. While stirring up, excessive quantity, i.e. 3.22 g (13.9 mmol), of methane disulfonic acid diethyl ester, i.e. $CH_2(SO_2OEt)_2$, was added. Under argon gas atmosphere, this was stirred up at room temperature for 24 to 96 hours. Unreacted impurities were rinsed with a large quantity of toluene, diethyl ether and hexane, and a precursor $C_{60}=(C(SO_2OEt)_2)_n$ of sulfonic acid type fullerene derivative was obtained.

Next, 1 g of the precursor $C_{60}=(C(SO_2OEt)_2)_n$ of the sulfonic acid type fullerene derivative thus obtained was weighed, and this was stirred up in 100 ml of 1M NaOH solution at room temperature or at 50° C. for one hour to 30 hours for hydrolysis. The solution obtained was subjected to proton ion exchange. On the sulfonic acid type fullerene derivative $C_{60}=(C(SO_3H)_2)n$ obtained above, measurement was made by MALDI-TOF-MS and element analysis was performed. The value of n was 4 to 6.

The above synthetic reaction can be expressed as follows:

$C_{60}+mCH_2(SO_2OEt)_2 \rightarrow C_{60}=(C(SO_2OEt)_2)_n$ $\rightarrow C_{60}=(C(SO_3Na)_2)_n$ $C_{60}=(C(SO_3H)_2)_n$ Then, FT-IR was determined on this specimen, and the results were almost the same as the results of FIG. 16 in Example 7. By the same procedure as in Example 7, pellets were prepared, and proton conductivity was measured. The same value as in Example 7 was obtained.

The proton conductor according to the present invention, having a carbon derivative which has a carbon material selected from the group consisting of a fullerene molecule, a cluster consisting essentially of carbon, a fiber-shaped carbon and a tube-shaped carbon, and mixtures thereof; and at least a proton dissociative group, the proton dissociative group being bonded to the carbon material via a cyclic structure of tricyclic or more. Accordingly, its dependency on the atmosphere is low, and it exhibits high proton conductivity even in dried air or under high temperature range, and it can be used continuously.

The functional group has a group with proton-dissociating property, and it is bonded to the above substance via a cyclic structure of tricyclic or more. As a result, it is possible to improve heat-resistant property and to attain higher chemical stability.

By the method to manufacture the proton conductor according to the present invention, it is possible to manufacture the proton conductor of the present invention having excellent properties as described above in easy and efficient manner, and it is also possible to reduce the manufacturing cost. Further, it is possible to synthesize the product on mass production basis.

In the electrochemical device of the present invention, a proton conductor sandwiched between a first electrode and a second electrode has the above derivative, which serves as a proton conductor having excellent properties as described above. As a result, the same effects as those of the proton conductor of the present invention can be attained, and no additional apparatus such as humidifier is required. Also, it is possible to design the system in compact size and in simple structure.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A proton conductor comprising:

a carbon derivative including a carbon material selected from the group consisting of a fullerene molecule, a cluster consisting essentially of carbon, a fiber-shaped carbon and a tube-shaped carbon, and mixtures thereof, and at least one proton dissociative group, the proton dissociative group being bonded to the carbon material via a cyclic structure of tricyclic or more, wherein at least one of the proton dissociative groups is —$SO_3H$.

2. A proton conductor according to claim 1, wherein the fullerene molecule is a spherical carbon cluster molecule $C_m$ where m is an integer selected from the group consisting of 36, 60, 70, 76, 78, 80, 82, 84, 86, 88, 90, 92, 94, 96 and combinations thereof.

3. A proton conductor according to claim 1, wherein at least an additional one of the proton dissociative groups is selected from the group consisting of —$PO(OH)_2$, —$SO_3H$, and —COOH.

4. An electrochemical device comprising:

a first electrode, a second electrode, and a proton conductor disposed between the first and second electrodes, wherein the proton conductor comprises a carbon derivative including a carbon material selected from the group consisting of a fullerene molecule, a cluster consisting essentially of carbon, a fiber-shaped carbon and a tube-shaped carbon, and mixtures thereof, and at least one proton dissociative group, the proton dissociative group being bonded to the carbon material via a cyclic structure of tricyclic or more.

5. The electrochemical device according to claim 4, wherein the fullerene molecule is a spherical carbon cluster molecule $C_m$ where m is an integer selected from the group consisting of 36, 60, 70, 76, 78, 80, 82, 84, 86, 88, 90, 92, 94, 96 and combinations thereof.

6. The electrochemical device according to claim 4, wherein at least one of the proton dissociative groups is selected from the group consisting of —$PO(OH)_2$, —$SO_3H$ and —COOH.

* * * * *